(12) United States Patent
Zheng et al.

(10) Patent No.: US 8,323,805 B2
(45) Date of Patent: Dec. 4, 2012

(54) EMISSIVE ARYL-HETEROARYL ACETYLENES

(75) Inventors: Shijun Zheng, San Diego, CA (US); Jensen Cayas, Bonita, CA (US); Sheng Li, Vista, CA (US); Amane Mochizuki, San Diego, CA (US); Hyunsik Chae, San Diego, CA (US)

(73) Assignee: Nitto Denko Corporation, Osaka (JP)

( * ) Notice: Subject to any disclaimer, the term of this patent is extended or adjusted under 35 U.S.C. 154(b) by 339 days.

(21) Appl. No.: 12/787,753

(22) Filed: May 26, 2010

(65) Prior Publication Data

US 2010/0308310 A1    Dec. 9, 2010

Related U.S. Application Data

(60) Provisional application No. 61/184,164, filed on Jun. 4, 2009.

(51) Int. Cl.
*H01L 51/50* (2006.01)

(52) U.S. Cl. ........ 428/690; 428/917; 313/504; 313/505; 313/506; 257/40; 257/E51.05; 257/E51.026; 257/E51.032; 548/152; 548/304.4

(58) Field of Classification Search ............ 428/690, 428/917; 313/504, 505, 506; 257/40, E51.05, 257/E51.026, E51.032; 548/152, 304.4
See application file for complete search history.

(56) References Cited

U.S. PATENT DOCUMENTS

| 4,769,384 A * | 9/1988 | Kise et al. ............ 514/394 |
| 6,232,322 B1 | 5/2001 | Malamas et al. |
| 2007/0259936 A1 | 11/2007 | Player et al. |
| 2008/0269486 A1 | 10/2008 | Zhou et al. |
| 2009/0066245 A1 | 3/2009 | Sugimoto et al. |
| 2009/0085029 A1 | 4/2009 | Mitsui et al. |
| 2009/0134783 A1 | 5/2009 | Lin et al. |
| 2010/0308310 A1 | 12/2010 | Zheng et al. |
| 2010/0308716 A1 | 12/2010 | Zheng |
| 2010/0326526 A1 | 12/2010 | Zheng |
| 2010/0327269 A1 | 12/2010 | Zheng |

FOREIGN PATENT DOCUMENTS

| CA | 1011749 | 6/1977 |
| DE | 2320528 | 11/1974 |
| DE | 3622036 | 1/1987 |
| EP | 0 499 222 | 2/1992 |
| GB | 1 469 818 A | 4/1977 |
| GB | 2367057 | 3/2002 |
| JP | 7-076542 A | 3/1995 |
| JP | 7207169 | 8/1995 |
| JP | 8184865 | 7/1996 |
| JP | 10-340786 A | 12/1998 |
| JP | 2002-096555858 A | 4/2002 |

(Continued)

OTHER PUBLICATIONS

Copending U.S. Appl. No. 12/788,535, filed May 27, 2010.

(Continued)

*Primary Examiner* — Jennifer Chriss
*Assistant Examiner* — Gregory Clark
(74) *Attorney, Agent, or Firm* — Knobbe, Martens, Olson & Bear, LLP

(57) ABSTRACT

Disclosed herein are compounds represented by a formula: $R^1$—O-A-C≡C-D, where $R^1$, A, and D are defined as described herein. Compositions and light-emitting devices related thereto are also disclosed.

15 Claims, 3 Drawing Sheets

FOREIGN PATENT DOCUMENTS

| | | |
|---|---|---|
| JP | 2011-16798 | 1/2011 |
| KR | 959189 B1 | 5/2010 |
| WO | WO 99/58518 A2 | 11/1999 |
| WO | WO 01/06240 | 1/2001 |
| WO | WO 02/046166 | 6/2002 |
| WO | WO 02093244 | 11/2002 |
| WO | WO 2004010996 | 2/2004 |
| WO | WO 2011/008560 | 1/2011 |

OTHER PUBLICATIONS

Copending U.S. Appl. No. 12/825,953, filed Jun. 29, 2010.

Copending U.S. Appl. No. 12/826,589, filed Jun. 29, 2010.

Dutta, Chromium(III) complexes of 2-(o-hydroxyphenyl)benzoxazole. Journal of the Indian Chemical Society (1981), 58(10), 1004-5.

Ge, Ziyi et al., "Solution-Processible Bipolar Triphenylamine-Benzimidazole Derivatives for Highly Efficient Single-Layer Organic Light-Emitting Diodes", Chemistry of Materials, Nov. 3, 2008, 20 (7), 2532-2537, XP002608601.

Ge, Ziyi et al., "Spin-Coated Highly Efficient Phosphorescent Organic Light-Emitting Diodes Based on Bipolar Triphenylamine-Benzimidazole Derivatives", Advanced Functional Materials, vol. 18, No. 4, Feb. 22, 2008, pp. 584-590, XP001510816, Wiley, ISSN:1616-301X.

Kauffman, et al., Synthesis and photophysical properties of fluorescent 2-aryl-1,3-dialkylbenzimidazolium ions and a 1-alkyl-2-arylbenzimidazole with excited state intramolecular proton-transfer. Journal of Heterocyclic Chemistry (1994), 31(4), 957-65.

Kim, et al., Synthesis and properties of highly fluorescent liquid crystals containing bexzoxazole moeity, Gordon and Breach Publishers, No. 337, 1999, pp. 405-408.

Magdolen, Synthesis and Antimicrobial Activity of new 2-phenylethynylbenzothiazoles and related salts. Arzneimittel-Forschung (2000), 50(11), 1023-1027.

Malamas, et al., Novel Benzofuran and Benzothiophene Biphenyls as Inhibitors of Protein Tyrosine Phosphatase 1B with Antihyperglycemic Properties. Journal of Medicinal Chemistry (2000), 43(7), 1293-1310.

Miller, Substituted Azole Derivatives as Nonlinear Optical Chromophores. Chemistry of Materials (1994), 6(7), 1023-32.

Nadipuram, Intra- and intermolecular trapping of cyclopentapyrazine carbenes derived from 1,2-dialkynylimidazoles. Tetrahedron Letters (2005), Volume Date 2006, 47(3), 353-356.

Petkova, Photophysical properties and quantum chemical calculations of differently substituted 2-(2-phenylethenyl)-benzoxazoles and benzothiazoles. Journal of Photochemistry and Photobiology, A: Chemistry (2000), 133(1-2), 21-25.

Postovskii, Zhurnal Obshchei Khimii (1962), 32 2617-24.

Ueda, et al., Synthesis of poly(benzothiazole)s by direct polycondensation of dicarboxylic acids with 2,5-diamino-1,4-benzenedithiol dihydrochloride using phosphorus pentoxide/methaneusulfonic acid as condensing agent and solvent, Polymer Journal vol. 18, No. 2, 1986 pp. 117-122.

Vinodkumar, et al., Synthesis of highly functionalized 2-(substituted biphenyl)benzimidazoles via Suzuki-Miyaura cross-coupling reaction. Journal of Heterocyclic Chemistry (2007), 44(6), 1521-1523.

\* cited by examiner

EMISSIVE ARYL-HETEROARYL ACETYLENES

CROSS-REFERENCE TO RELATED APPLICATIONS

This application claims the benefit of U.S. Provisional Application 61/184,164, filed Jun. 4, 2009, which is incorporated by reference herein in its entirety.

BACKGROUND

1. Field of the Invention

The embodiments relate to light-emitting compounds and compositions, as well as light-emitting devices that include the light-emitting compounds or compositions.

2. Description of the Related Art

Organic light-emitting devices have been widely developed for flat panel displays, and are moving fast towards solid state lighting (SSL) applications. Organic Light Emitting Diodes (OLEDs) comprise a cathode, a hole transporting layer, an emissive layer, an electron transporting layer, and an anode. Light emitted from an OLED device is the result of recombination of positive charges (holes) and negative charges (electrons) inside an organic (emissive) layer. The holes and electrons combine within a single molecule or a small cluster of molecules to generate excitons, which are molecules in an excited state, or groups of organic molecules bound together in an excited state. When the organic molecules release the required energy and return to their stable state, photons are generated. The organic compound or group of compounds which emit the photons are referred as an electro-fluorescent material or electro-phosphorescent material depending on the nature of the radiative process. Thus the OLED emissive compounds may be selected for their ability to absorb primary radiation and emit radiation of a desired wavelength. For blue emitters, for example, emission within principle emission bands of 440 to 490 nm is typically desirable.

SSL applications may require a white OLED device to achieve greater than 1,500 lm brightness, a color rendering index (CRI) greater than 70, and an operating time greater than 100,000 hours at 1,000 lm/w. There are many approaches for generating white light from an OLED, but two common approaches are: direct combination of red, blue, and green light using either lateral patterning or vertical stacking of three emitters; and partial down conversion of blue light in combination with yellow phosphors. Both of these common approaches may be more effective if a highly efficient chemical- and photo-stable blue dye is employed. However, blue emitters may be less stable than dyes which emit other colors. Furthermore, there are very few blue emitting devices showing CIE y value below 0.2 yet still with respectable efficiency. Thus, the development of deep blue emitters with good stability and high luminescence efficiency is desirable to effectively reduce power consumption and generate emission of different colors.

Diphenyl acetylene compounds have been used as additives in organic photoreflective polymer composites for electrooptic, photorefractive and liquid crystal applications (see for example, US 2006/0050354 and US 2006/000363). Thompson, et al (U.S. Pat. No. 6,210,814) discloses a polarization dopant molecule that is said to contribute to the local dipole moment to spectrally shift the emission of a separate emissive dopant. Thompson, et al (U.S. Pat. No. 6,045,930) discloses a (tris-diphenylacetylene amine) compound However, none of these compounds were described as blue emitting fluorescent compounds. Thus, the development of deep blue emitters with good stability and high luminescence efficiency is desirable to effectively reduce power consumption and generate emission of different colors.

SUMMARY OF THE INVENTION

An embodiment provides compounds of the Formula 1 that are useful as deep blue emitters,

$$R^1-O-A-C\equiv C-D \quad \text{(Formula 1)}$$

wherein $R^1$ is $C_{1-30}$ alkyl, optionally substituted $C_{6-10}$ aryl, or $C_{1-30}O_{1-15}$ ether; A is optionally substituted p-phenylene; and D is optionally substituted benzooxal-2-yl or optionally substituted benzoimidazol-2-yl.

An embodiment provides compounds of the Formula 2 that are useful as deep blue emitters,

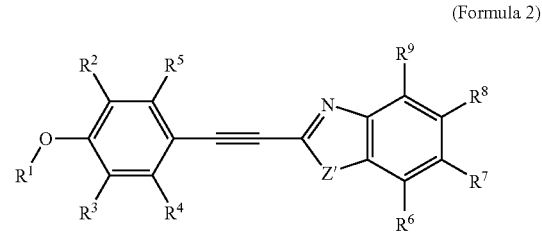

(Formula 2)

wherein $R^1$ is $C_{1-30}$ alkyl, optionally substituted $C_{6-10}$ aryl, or $C_{1-30}O_{1-15}$ ether; $R^2$, $R^3$, $R^4$ and $R^5$ are independently H, $C_{1-10}$ alkyl, or $C_{1-10}$ alkoxyl; $R^6$, $R^7$, $R^8$, and $R^9$ are independently H, optionally substituted $C_{6-30}$ aryl, $C_{1-10}$ alkyl, or $C_{1-10}$ alkoxyl; and Z' is independently $NR^{10}$ or O, wherein $R^{10}$ is phenyl, phenylmethyl, or (4-halophenyl)methyl.

Another embodiment provides a light-emitting device, comprising an anode layer; a cathode layer; and a light-emitting layer positioned between, and electrically connected to, the anode layer and the cathode layer, the light-emitting layer comprising a compound disclosed herein.

These and other embodiments are described in greater detail below.

DETAILED DESCRIPTION

Figure 1:
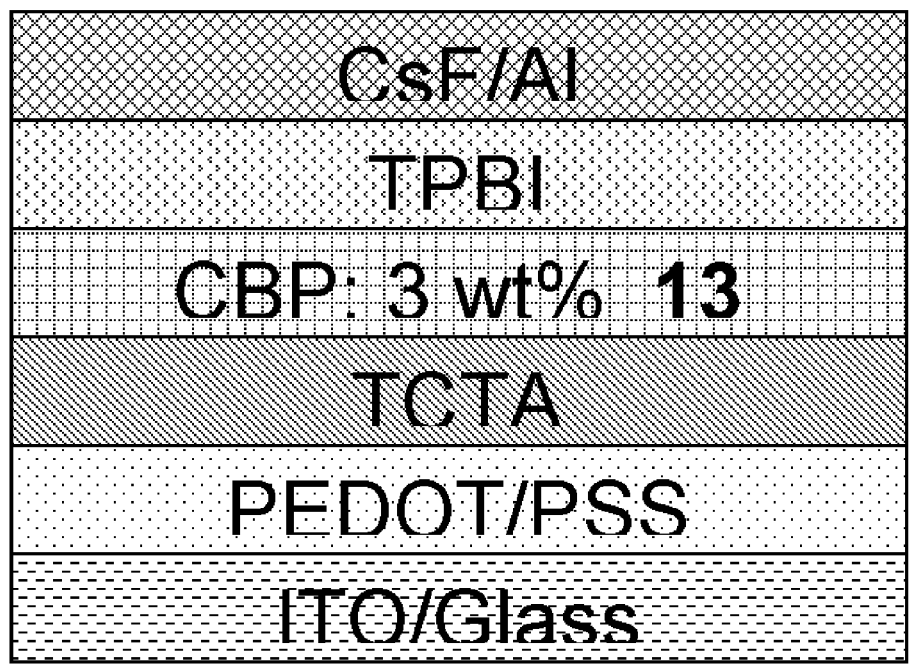
FIG. 1 shows an exemplary configuration of an organic light-emitting device incorporating a compound of Formula 1.

Reference herein to a compound also includes any salts of that compound.

Unless otherwise indicated, when a structural feature such as alkyl or aryl is referred to as being "optionally substituted," it is meant that the feature may have no substituents or may have one or more substituents. A feature that is "substituted" has one or more substituents. The term "substituent" has the ordinary meaning known to one of ordinary skill in the art. In some embodiments, the substituent is a halogen, or has from 1-20 carbon atoms, from 1-10 carbon atoms, or has a molecular weight of less than about 500, 300, or 200. In other embodiments, the substituent has from 1-20 carbon atoms and from 0-10 heteroatoms independently selected from: N, O, S, F, Cl, Br, I, and combinations thereof. In some embodiments, the substituent has from 1-10 carbon atoms and from 0-5 heteroatoms independently selected from: N, O, S, F, Cl, Br, I, and combinations thereof. In some embodiments, each substituent consists of 0-20 carbon atoms, 0-47 hydrogen atoms, 0-5 oxygen atoms, 0-2 sulfur atoms, 0-3 nitrogen atoms, 0-1 silicon atoms, 0-7 fluorine atoms, 0-3 chlorine atoms, 0-3 bromine atoms, and 0-3 iodine atoms. Examples include, but are not limited to, alkyl, alkenyl, alkynyl, cycloalkyl, cycloalkenyl, cycloalkynyl, aryl, heteroaryl, heteroalicyclyl, aralkyl, heteroaralkyl, (heteroalicyclyl)alkyl, hydroxy, protected hydroxyl, alkoxyl, aryloxy, acyl, ester, mercapto, alkylthio, arylthio, cyano, halogen, carbonyl, thiocarbonyl, O-carbamyl, N-carbamyl, O-thiocarbamyl, N-thiocarbamyl, C-amido, N-amido, S-sulfonamido, N-sulfonamido, C-carboxy, protected C-carboxy, O-carboxy, isocyanato, thiocyanato, isothiocyanato, nitro, silyl, sulfenyl, sulfinyl, sulfonyl, haloalkyl, haloalkoxyl, trihalomethanesulfonyl, trihalomethanesulfonamido, and amino, including mono- and di-substituted amino groups, and the protected derivatives thereof.

The term "electron-donating substituent" has the ordinary meaning known to one of ordinary skill in the art. In some embodiments, the electron-donating substituent is a halogen, or has from 1-20 carbon atoms, from 1-10 carbon atoms, or has a molecular weight of less than about 500, 300, or 200. In other embodiments, the electron-donating substituent has from 1-20 carbon atoms and from 0-10 heteroatoms independently selected from: N, O, S, F, Cl, Br, I, and combinations thereof. In some embodiments, the electron-donating substituent has from 1-10 carbon atoms and from 0-5 heteroatoms independently selected from: N, O, S, F, Cl, Br, I, and combinations thereof. In some embodiments, the electron-donating substituent is an electron donor with respect to a phenyl ring to which it is attached. Some examples of electron-donating substituents may include, but are not limited to: alkyl, alkenyl, alkynyl, cycloalkyl, cycloalkenyl, cycloalkynyl, aryl, heteroaryl, heteroalicyclyl, aralkyl, heteroaralkyl, (heteroalicyclyl)alkyl, hydroxy, protected hydroxyl, alkoxyl, aryloxy, O-ester, mercapto, alkylthio, arylthio, O-carbamyl, N-carbamyl, O-thiocarbamyl, N-thiocarbamyl, N-amido, O-carboxy, silyl, and amino.

The term "electron-withdrawing substituent" has the ordinary meaning known to one of ordinary skill in the art. In some embodiments, the electron-withdrawing substituent is a halogen, or has from 1-20 carbon atoms, from 1-10 carbon atoms, or has a molecular weight of less than about 500, 300, or 200. In other embodiments, the electron-withdrawing substituent has from 1-20 carbon atoms and from 0-10 heteroatoms independently selected from: N, O, S, F, Cl, Br, I, and combinations thereof. In some embodiments, the electron-withdrawing substituent has from 1-10 carbon atoms and from 0-5 heteroatoms independently selected from: N, O, S, F, Cl, Br, I, and combinations thereof. In some embodiments, the electron-withdrawing substituent is electron withdrawing with respect to a phenyl ring to which it is attached. Some examples of electron-withdrawing substituents may include, but are not limited to: acyl, C-ester, cyano, halogen, carbonyl, C-amido, thiocarbonyl, C-carboxy, protected C-carboxy, isocyanato, thiocyanato, isothiocyanato, nitro, sulfinyl, sulfonyl, perflouoralkyl, trihalomethanesulfonyl, and trihalomethanesulfonamido.

The phrase "substituent attaching at a carbon atom" refers to a substituent wherein the atom of the substituent that attaches to the rest of the structure is a carbon atom. Examples include, but are not limited to: alkyl, alkenyl, alkynyl, phenyl, acyl, etc.

The term "aryl" as used herein refers to an aromatic ring or ring system. Exemplary non-limiting aryl groups are phenyl, naphthyl, etc.

"$C_{6-30}$ aryl" refers to aryl where the ring or ring system has from 6-30 carbon atoms. "$C_{6-10}$ aryl" does not characterize or limit any hydrogen or substituents attached to the ring atoms.

"$C_{6-10}$ aryl" refers to aryl where the ring or ring system has from 6-10 carbon atoms. "$C_{6-10}$ aryl" does not characterize or limit any hydrogen or substituents attached to the ring atoms.

The term "heteroaryl" as used herein refers to an aromatic ring or ring system having one or more atoms in an aromatic ring selected from nitrogen, oxygen, or sulfur. Examples include pyridinyl, pyridazinyl, triazinyl, pyridinyl, pyrimidinyl, pyrazinyl, benzoimidazolyl, indolyl, benzooxazolyl, etc.

The term "alkyl" as used herein refers to a moiety consisting of carbon and hydrogen containing no double or triple bonds. Alkyl may be linear, branched, cyclic, or a combination thereof, and contain from one to thirty-five carbon atoms. Examples of alkyl groups include but are not limited to methyl, ethyl, propyl, isopropyl, cyclopropyl, n-butyl, isobutyl, tert-butyl, cyclobutyl, pentyl isomers, cyclopentane, hexyl isomer, cyclohexane, and the like. Linear alkyl is —$(CH_2)_q CH_3$, where q is 0-34.

"$C_{1-30}$ alkyl" is alkyl having from 1 to 30 carbon atoms such as methyl, ethyl, propyl isomers, butyl isomers, cyclobutyl isomers, pentyl isomers, cyclopentyl isomers, hexyl isomers, cyclohexyl isomer, heptyl isomers, cycloheptyl isomers, octyl isomers, cyclooctyl isomers, nonyl isomers, cyclononyl isomers, decyl isomer, cyclodecyl isomers, etc.

"$C_{1-10}$ alkyl" is alkyl having from 1 to 10 carbon atoms such as methyl, ethyl, propyl isomers, butyl isomers, cyclobutyl isomers, pentyl isomers, cyclopentyl isomers, hexyl isomers, cyclohexyl isomer, heptyl isomers, cycloheptyl isomers, octyl isomers, cyclooctyl isomers, nonyl isomers, cyclononyl isomers, decyl isomer, cyclodecyl isomers, etc.

The term "ether" refers to a moiety consisting of carbon, hydrogen, and single bonded oxygen, i.e. —O—, provided that —O—O— is not present. A person of ordinary skill in the art understands that when a moiety such as $R^1$ is an ether (such as a $C_{1-30}O_{1-15}$ ether) which is directly attached to an oxygen atom (e.g. $R^1$—O-A-C≡C-D), a carbon atom of the moiety attaches to the oxygen atom so that —O—O— is excluded (e.g. —O—O—C≡C-D would be excluded). Examples include: —O-alkyl, such as —O-methyl, —O-ethyl, —O-propyl, —O-isopropyl, etc.; -alkyl-O-alkyl, such as -methyl-O-methyl, -methyl-O-ethyl, -methyl-O-isopropyl, etc.; and —$(CH_2CH_2O)_n$—.

"Alkoxyl" is an ether of the formula —O-alkyl. "$C_{1-10}$ alkoxyl" refers to alkoxyl wherein the alkyl is $C_{1-10}$ alkyl as described above.

"$C_{1-30}O_{1-15}$ ether" is ether having from 1-30 carbon atoms, from 1-15 oxygen atoms, and hydrogen. Examples include, but are not limited to, —$(CH_2CH_2O)_n CH_3$— where n is 1, 2, 3, 4, 5, 6, 7, 8, 9, 10, 11, 12, 13, or 14; —$[CH(CH_3)CH_2O]_n CH_3$— where n is 1, 2, 3, 4, 5, 6, 7, 8, or 9; and —$(CH_2)_o$—O—$(CH_2)_p CH_3$ where o+p is from 1-29.

"$C_{1-12}O_{1-6}$ ether" is ether having from 1-12 carbon atoms, from 1-6 oxygen atoms, and hydrogen. Examples include, but are not limited to, —$(CH_2CH_2O)_n CH_3$— where n is 1, 2, 3, 4, or 5; —[CH(CH$_3$)CH$_2$O]$_n$CH$_3$— where n is 1, 2, or 3; and —(CH$_2$)$_o$—O—(CH$_2$)$_p$CH$_3$ where o+p is from 1-11.

"C$_{1-10}$O ether" is ether having from 1-10 carbon atoms, 1 oxygen atom, and hydrogen, such as: —O—C$_x$H$_{2x+1}$ or —OC$_x$H$_{2x}$, where x is 1-10, e.g. —O-methyl, —O-ethyl, —O—C$_3$H$_7$, —OC$_3$H$_6$, —OC$_4$H$_9$, —OC$_5$H$_{11}$, —O—C$_5$H$_{10}$, etc.

Other groups having designations such as C$_{1-y}$ or C$_{1-y}$O$_{1-z}$, etc, wherein each y and z are independently any integer, have similar meanings to those described above.

The term "optionally substituted p-phenylene" is a subset of "arylene" (e.g. an aryl attaching at two positions) or "phenylene" (e.g. a phenyl attaching at two positions) and refers to the moty:

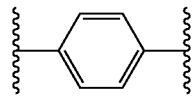

wherein the carbons that do not attach to the remainder of the molecule may optionally have substituents.

The term "benzooxal-2-yl" refers to the moiety:

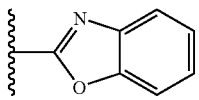

wherein the carbons that do attach to the remainder of the molecule may optionally have substituents.

The term "substituted benzoimidazol-2-yl" refers to the moiety:

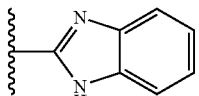

wherein the unsaturated nitrogen, or the carbons that do attach to the remainder of the molecule may optionally have substituents.

The term "phenylmethyl" refers to the moiety:

The term "(4-halophenyl)methyl" refers to the moiety:

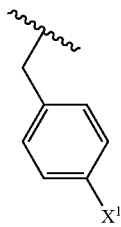

wherein X$^1$ is halo, e.g. F, Cl, Br, etc.

The "work function" of a metal is a measure of the minimum energy required to extract an electron from the surface of the metal.

A "high work function metal" is a metal or alloy that easily injects holes and typically has a work function greater than or equal to 4.5.

A "low work function metal" is a metal or alloy that easily loses electrons and typically has a work function less than 4.3.

A material is white light-emitting if it emits white light. White light is light having the approximate CIE color coordinates (X=1/3, Y=1/3). The CIE color coordinates (X=1/3, Y=1/3) is defined as the achromatic point. The X and Y color coordinates are weights applied to the CIE primaries to match a color. A more detailed description of these terms may be found in CIE 1971, International Commission on Illumination, Colorimetry: Official Recommendations of the International Commission on Illumination, Publication CIE No. 15 (E-1.3.1) 1971, Bureau Central de la CIE, Paris, 1971 and in F. W. Billmeyer, Jr., M. Saltzman, Principles of Color Technology, 2nd edition, John Wiley & Sons, Inc., New York, 1981, both of which are hereby incorporated by reference in their entireties. The color rendering index (CRI) refers to the ability to render various colors and has values ranging from 0 to 100, with 100 being the best.

A material is "deep blue" emitting if it emits deep blue light. Deep blue light is light having the approximate CIE color coordinates (X=[0.14], Y=[0.08], CIE 1931).

With respect to Formula 1, in some embodiments, A may comprise electron donating substituents and D may comprises electron-withdrawing substituents. In some embodiments, the electron-donating substituent is a better electron donor than a hydrogen atom. In some embodiments, the electron-withdrawing substituent is a better electron withdrawer than a hydrogen atom.

While the embodiments are not limited by any particular theory or mechanism, it is believed that constructing an emissive molecule to have a "push" (electron donating) end and a "pull" (electron-withdrawing or electron-accepting) end affects the orbital structure of the emissive molecule to the extent that the energy levels of the molecule may shift from an ultraviolet emitting compound to a deep blue emitting compound. Thus in some embodiments, R$^1$—O— of Formula 1, is at the "push" end of the blue emitting compound. In other embodiments, the "push" end of Formula 1 may comprise a substituent having an electron donating heteroatom, such as N, O or S, which electron-donating heteroatom directly attaches to the a phenyl or phenylene ring at the "push" end. In some embodiments, the electron donating group may be a methyl group, an isopropyl group, a phenyloxy group, a benzyloxy group, a dimethylamino group, a diphenylamino group, a pyrrolidine group, or a phenyl group, In some embodiments, the "pull" end of the deep blue emitting compound comprises a heteroaromatic ring system comprising a ring heteroatom which is more electronegative than carbon, such as nitrogen or oxygen. Thus, a heteroaromatic ring system itself can be an electron withdrawing group. For example, optionally substituted benzimidazole or optionally substituted benzoxazole moiety are heteroaromatic ring systems that may function as a "pull" end of a deep blue emitting compound.

In some embodiments, the substituents of A may be independently F, Cl, Br, I, $C_{1-10}$ alkyl, $C_{1-10}O$ ether, or optionally substituted $C_{6-10}$ aryl; the substituents of D may be independently F, Cl, Br, I, $CF_3$, —CN, —$NO_2$, $CO_2H$, $C_{1-10}$ acyl, $C_{1-10}$acyloxy, $C_{1-10}$ alkyl, or $C_{1-10}$ alkoxyl.

One embodiment provides compounds that are useful as deep blue emitters. The compounds are represented by a Formula 2 as set forth above, wherein $R^1$ is $C_{1-30}$ alkyl, optionally substituted optionally substituted $C_{6-10}$ aryl, or $C_{1-30}O_{1-15}$ ether; $R^2$, $R^3$, $R^4$ and $R^5$ may independently be H or any substituent described above with respect to A of Formula 1; $R^6$, $R^7$, $R^8$, and $R^9$ may be any substituent described above with respect to D of Formula 1; and Z' may be independently $NR^{10}$ or O, wherein $R^{10}$ is phenyl, phenylmethyl, or (4-halophenyl)methyl.

In some embodiments $R^2$, $R^3$, $R^4$ and $R^5$ may independently be H, $C_{1-10}$ alkyl, or $C_{1-10}$ alkoxyl; and $R^6$, $R^7$, $R^8$, and $R^9$ may independently be H, optionally substituted $C_{6-30}$ aryl, $C_{1-10}$ alkyl, or $C_{1-10}$ alkoxyl.

With respect to Formula 1 or Formula 2, in some embodiments, $R^1$ may be, but is not limited to: $C_{1-12}$ alkyl; $C_{1-12}O_{1-6}$ ether; or phenyl having 0, 1, 2, or 3 substituents independently selected from $C_{1-12}$ alkyl and $C_{1-12}O_{1-6}$ ether. In some embodiments, $R^1$ is selected from: methyl, ethyl, $C_3H_7$, $C_4H_9$, $C_5H_{11}$, $C_6H_{13}$, $C_7H_{15}$, $C_8H_{17}$, $C_3H_6$, $C_4H_8$, $C_5H_{10}$, $C_6H_{12}$, $C_7H_{14}$, $CH_2CH_2OCH_3$, —$(CH_2CH_2O)_2CH_3$, —$(CH_2CH_2O)_3CH_3$, and phenyl optionally substituted with 1 or 2 substituents independently selected from: $C_{1-6}$ alkyl and $C_{1-6}$ alkoxyl.

In some embodiments, $R^1$ is selected from the following groups:

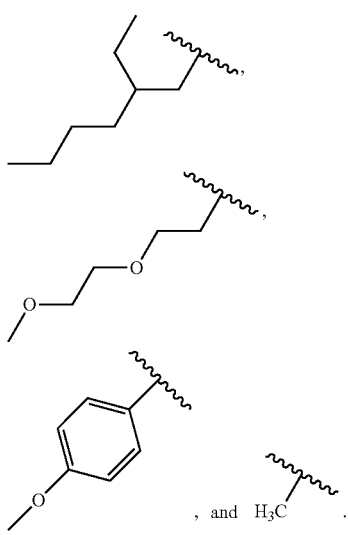

In some embodiments, $R^2$, $R^2$, $R^4$, and $R^5$ are independently selected from: H, $C_{1-4}$ alkyl, and $C_{1-4}$ alkoxyl. In some embodiments, $R^4$ and $R^5$ are independently selected from: $CH_3$ and $OCH_3$.

In some embodiments, the deep blue emissive compound may be represented by the following formula:

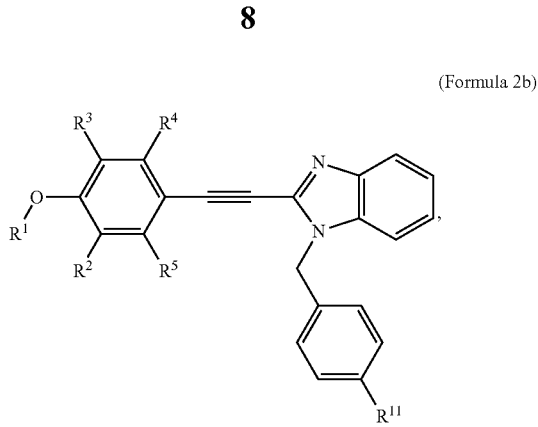

(Formula 2b)

wherein $R^1$, $R^2$, $R^3$, $R^4$, $R^5$ are as defined above in Formula 2, and $R^{11}$ is H, F, Br, or Cl.

In some embodiments, the deep blue emissive compound may be represented by the following formula:

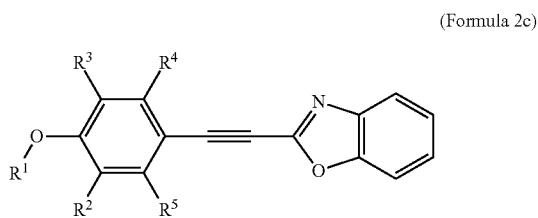

(Formula 2c)

wherein $R^1$, $R^2$, $R^3$, $R^4$, $R^5$ are as defined above in Formula 2.

Non-limiting examples of compounds of Formulae 1 and 2 include:

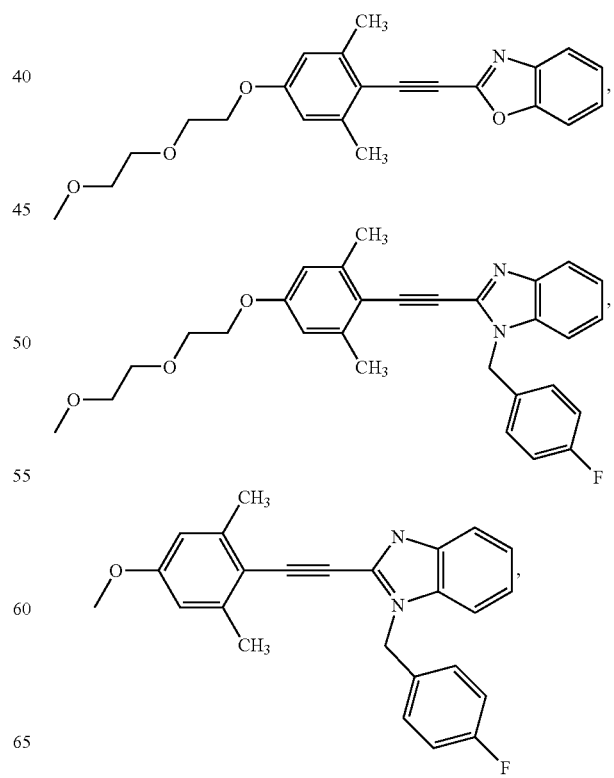

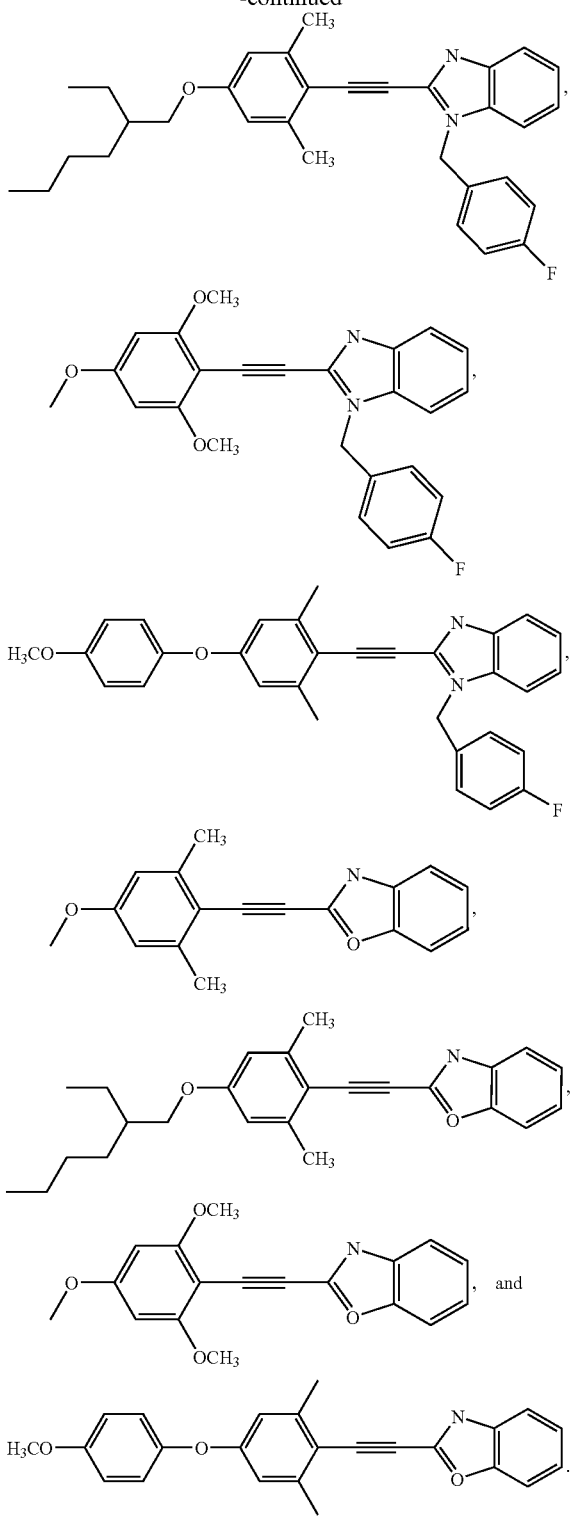

The compounds and compositions described herein can be incorporated into light-emitting devices in various ways. For example, an embodiment provides a light-emitting device comprising: an anode layer (e.g., an anode layer comprising a high work function metal); a cathode layer (e.g., a cathode layer comprising a low work function metal); and a light-emitting layer positioned between, and electrically connected to, the anode layer and the cathode layer. The light-emitting layer comprises the compounds and/or compositions disclosed herein.

The anode layer may comprise a conventional material such as a metal, mixed metal, alloy, metal oxide or mixed-metal oxide, conductive polymer, and/or an inorganic material such as carbon nanotube (CNT). Examples of suitable metals include the Group 1 metals, the metals in Groups 4, 5, 6, and the Group 8-10 transition metals. If the anode layer is to be light-transmitting, metals in Group 10 and 11, such as Au, Pt, and Ag or alloys thereof, or mixed-metal oxides of Group 12, 13, and 14 metals, such as indium-tin-oxide (ITO), indium-zinc-oxide (IZO), and the like, may be used. In some embodiments, the anode layer may be an organic material such as polyaniline. The use of polyaniline is described in "Flexible light-emitting diodes made from soluble conducting polymer," Nature, vol. 357, pp. 477-479 (11 Jun. 1992). Examples of suitable high work function metals and metal oxides include but are not limited to Au, Pt, or alloys thereof, ITO, IZO, and the like. In some embodiments, the anode layer can have a thickness in the range of about 1 nm to about 1000 nm.

A cathode layer may include a material having a lower work function than the anode layer. Examples of suitable materials for the cathode layer include those selected from alkali metals of Group 1, Group 2 metals, Group 12 metals including rare earth elements, lanthanides and actinides, materials such as aluminum, indium, calcium, barium, samarium and magnesium, and combinations thereof. Li-containing organometallic compounds, LiF, and $Li_2O$ may also be deposited between the organic layer and the cathode layer to lower the operating voltage. Suitable low work function metals include but are not limited to Al, Ag, Mg, Ca, Cu, Mg/Ag, LiF/Al, CsF, CsF/Al or alloys thereof. In an embodiment, the cathode layer can have a thickness in the range of about 1 nm to about 1000 nm.

The amount of the compounds disclosed herein in the light-emitting composition can vary. In some embodiments, the light-emitting layer consists essentially of a compound disclosed herein. In other embodiments, the emissive layer comprises, or alternatively, consists essentially of, a host material and at least one of the emissive compounds disclosed herein. If there is a host material, the amount of the emissive compound with respect to the host material may be any amount suitable to produce adequate emission. In some embodiments, the amount of a compound disclosed herein in the light-emitting layer is in the range of from about 1% to about 100% by weight of the light-emitting layer, about 1% to about 10%, or alternatively, about 3% by weight of the light-emitting layer.

The thickness of the light-emitting layer may vary. In some embodiments, the light-emitting layer has a thickness in the range of from about 20 nm to about 150 nm, or from about 20 nm to about 200 nm.

The host in the emissive layer may be at least one of: one or more hole-transport materials, one or more electron-transport materials, and one or more ambipolar materials, which are materials understood by those skilled in the art to be capable of transporting both holes and electrons.

In some embodiments, the hole-transport material comprises at least one of an aromatic-substituted amine, a carbazole, a polyvinylcarbazole (PVK), e.g. poly(9-vinylcarbazole); N,N'-bis(3-methylphenyl)N,N'-diphenyl-[1,1'-biphenyl]-4,4'-diamine (TPD); polyfluorene; a polyfluorene copolymer; poly(9,9-di-n-octylfluorene-alt-benzothiadiazole); poly(paraphenylene); poly[2-(5-cyano-5-methylhexyloxy)-1,4-phenylene]; 1,1-Bis(4-bis(4-methylphenyl)aminophenyl)cyclohexane; 2,9-Dimethyl-4,7-diphenyl-1,10-phenanthroline; 3,5-Bis(4-tert-butyl-phenyl)-4-phenyl[1,2,4]triazole; 3,4,5-Triphenyl-1,2,3-triazole; 4,4',4"-Tris(N-(naphthylen-2-yl)-N-phenylamino)triphenylamine; 4,4',4'-tris(3-methylphenylphenylamino)triphenylamine (MTDATA); 4,4'-bis[N-(naphthyl)-N-phenyl-amino]biphenyl (α-NPD); 4,4'-bis[N,N'-(3-tolyl)amino]-3,3'-dimethylbiphenyl (HMTPD); 4,4'-N,N'-dicarbazole-biphenyl (CBP); 1,3-N,N-dicarbazole-benzene (mCP); poly(9-vinylcarbazole) (PVK); a benzidine; a phenylenediamine; a phthalocyanine metal complex; a polyacetylene; a polythiophene; a triphenylamine; an oxadiazole; copper phthalocyanine; N,N'N"-1,3,5-tricarbazoloylbenzene (tCP); N,N'-bis(4-butylphenyl)-N,N'-bis(phenyl)benzidine; mixtures thereof, and the like.

In some embodiments, the electron-transport material comprises at least one of 2-(4-biphenylyl)-5-(4-tert-butylphenyl)-1,3,4-oxadiazole (PBD); 1,3-bis(N,N-t-butyl-phenyl)-1,3,4-oxadiazole (OXD-7), 1,3-bis[2-(2,2'-bipyridine-6-yl)-1,3,4-oxadiazo-5-yl]benzene; 3-phenyl-4-(1'-naphthyl)-5-phenyl-1,2,4-triazole (TAZ); 2,9-dimethyl-4,7-diphenyl-phenanthroline (bathocuproine or BCP); aluminum tris(8-hydroxyquinolate) (Alq3); and 1,3,5-tris(2-N-phenyl-benzimidazolyl)benzene; 1,3-bis[2-(2,2'-bipyridine-6-yl)-1,3,4-oxadiazo-5-yl]benzene (BPY-OXD); 3-phenyl-4-(1'-naphthyl)-5-phenyl-1,2,4-triazole (TAZ), 2,9-dimethyl-4,7-diphenyl-phenanthroline (bathocuproine or BCP); and 1,3,5-tris[2-N-phenylbenzimidazol-z-yl]benzene (TPBI). In one embodiment, the electron transport layer is aluminum quinolate (Alq$_3$), 2-(4-biphenylyl)-5-(4-tert-butylphenyl)-1,3,4-oxadiazole (PBD), phenanthroline, quinoxaline, 1,3,5-tris [N-phenylbenzimidazol-z-yl]benzene (TPBI), or a derivative or a mixture thereof.

In some embodiments, the device comprises no electron transport or hole transport layer. In some embodiments, the device consists essentially of the anode layer, the cathode layer, and the light-emitting layer.

In other embodiments, the light-emitting device may further comprise a hole-transport layer disposed between the anode and the light-emitting layer. The hole-transport layer may comprise at least one hole-transport material. Suitable hole-transport materials may include those listed above in addition to any others known to those skilled in the art. In some embodiments, the light-emitting device may further comprise an electron-transport layer disposed between the cathode and the light-emitting layer. The electron-transport layer may comprise at least one electron-transport material. Suitable electron transport materials include those listed above and any others known to those skilled in the art.

If desired, additional layers may be included in the light-emitting device. These additional layers may include an electron injection layer (EIL), a hole blocking layer (HBL), an exciton blocking layer (EBL), and/or a hole injection layer (HIL). In addition to separate layers, some of these materials may be combined into a single layer.

In some embodiments, the light-emitting device can include an electron injection layer between the cathode layer and the light emitting layer. A number of suitable electron injection materials are known to those skilled in the art. Examples of suitable material(s) that can be included in the electron injection layer include but are not limited to, an optionally substituted compound selected from the following: aluminum quinolate (Alq$_3$), 2-(4-biphenylyl)-5-(4-tert-butylphenyl)-1,3,4-oxadiazole (PBD), phenanthroline, quinoxaline, 1,3,5-tris[N-phenylbenzimidazol-z-yl]benzene (TPBI) a triazine, a metal chelate of 8-hydroxyquinoline such as tris(8-hydroxyquinoliate) aluminum, and a metal thioxinoid compound such as bis(8-quinolinethiolato) zinc. In one embodiment, the electron injection layer is aluminum quinolate (Alq$_3$), 2-(4-biphenylyl)-5-(4-tert-butylphenyl)-1,3,4-oxadiazole (PBD), phenanthroline, quinoxaline, 1,3,5-tris [N-phenylbenzimidazol-z-yl]benzene (TPBI), or a derivative or a combination thereof.

In some embodiments, the device can include a hole blocking layer, e.g., between the cathode and the light-emitting layer. Various suitable hole blocking materials that can be included in the hole blocking layer are known to those skilled in the art. Suitable hole blocking material(s) include but are not limited to, an optionally substituted compound selected from the following: bathocuproine (BCP), 3,4,5-triphenyl-1,2,4-triazole, 3,5-bis(4-tert-butyl-phenyl)-4-phenyl-[1,2,4]triazole, 2,9-dimethyl-4,7-diphenyl-1,10-phenanthroline, and 1,1-bis(4-bis(4-methylphenyl)aminophenyl)-cyclohexane.

In some embodiments, the light-emitting device can include an exciton blocking layer, e.g., between the light-emitting layer and the anode. In an embodiment, the band gap of a material(s) of the exciton blocking layer is large enough to substantially prevent the diffusion of excitons. A number of suitable exciton blocking materials that can be included in the exciton blocking layer are known to those skilled in the art. Examples of material(s) that can compose an exciton blocking layer include an optionally substituted compound selected from the following: aluminum quinolate (Alq$_3$), 4,4'-bis[N-(naphthyl)-N-phenyl-amino]biphenyl (α-NPD), 4,4'-N,N'-dicarbazole-biphenyl (CBP), and bathocuproine (BCP), and any other material(s) that have a large enough band gap to substantially prevent the diffusion of excitons.

In some embodiments, the light-emitting device can include a hole injection layer, e.g., between the light-emitting layer and the anode. Various suitable hole injection materials that can be included in the hole injection layer are known to those skilled in the art. Exemplary hole injection material(s) include an optionally substituted compound selected from the following: a polythiophene derivative such as poly(3,4-ethylenedioxythiophene (PEDOT)/polystyrene sulfonic acid (PSS), a benzidine derivative such as N,N,N',N'-tetraphenylbenzidine, poly(N,N'-bis(4-butylphenyl)-N,N'-bis(phenyl) benzidine), a triphenylamine or phenylenediamine derivative such as N,N'-bis(4-methylphenyl)-N,N'-bis(phenyl)-1,4-phenylenediamine, 4,4',4"-tris(N-(naphthylen-2-yl)-N-phenylamino)triphenylamine, an oxadiazole derivative such as 1,3-bis(5-(4-diphenylamino)phenyl-1,3,4-oxadiazol-2-yl) benzene, a polyacetylene derivative such as poly(1,2-bis-benzylthio-acetylene), and a phthalocyanine metal complex derivative such as phthalocyanine copper. Hole-injection materials, while still being able to transport holes, may have a hole mobility substantially less than the hole mobility of conventional hole transport materials.

Those skilled in the art recognize that the various materials described above can be incorporated in several different layers depending on the configuration of the device. In one embodiment, the materials used in each layer are selected to result in the recombination of the holes and electrons in the light-emitting layer. An example of a device configuration that incorporates the various layers described herein is illustrated schematically in FIG. 1. The electron injection layer (EIL), electron transport layer (ETL), hole blocking layer (HBL), exciton blocking layer (EBL), hole transport layer (HTL), and hole injection layer (HIL) can be incorporated in the light-emitting device using methods known to those skilled in the art (e.g., vapor deposition).

The emissive compositions may be prepared by adapting methods known in the art for other emissive compositions.

For example, the emissive compositions may be prepared by dissolving or dispersing the emissive compound in a solvent and depositing the compound on the appropriate layer of the device. The liquid may be a single phase, or may comprise one or more additional solid or liquid phases dispersed in it. The solvent may then be allowed to evaporate, or the solvent may be removed via heat or vacuum, to provide an emissive composition. If a host is present, it may be dissolved or dispersed in the solvent with the emissive device and treated as explained above. Alternatively, the compound may be added to a molten or liquid host material, which is then allowed to solidify to provide a viscous liquid or solid emissive composition.

Light-emitting devices comprising the compounds disclosed herein can be fabricated using techniques known in the art, as informed by the guidance provided herein. For example, a glass substrate can be coated with a high work functioning metal such as ITO which can act as an anode. After patterning the anode layer, a light-emitting layer that includes at least a compound disclosed herein can be deposited on the anode. The cathode layer, comprising a low work functioning metal (e.g., Mg:Ag), can then be deposited, e.g., vapor evaporated, onto the light-emitting layer. If desired, the device can also include an electron transport/injection layer, a hole blocking layer, a hole injection layer, an exciton blocking layer and/or a second light-emitting layer that can be added to the device using techniques known in the art, as informed by the guidance provided herein.

In some embodiments, the light-emitting device (e.g., OLED) is configured by a wet process such as a process that comprises at least one of spraying, spin coating, drop casting, inkjet printing, screen printing, etc. Some embodiments provide a composition which is a liquid suitable for deposition onto a substrate. The liquid may be a single phase, or may comprise one or more additional solid or liquid phases dispersed in it. The liquid typically comprises a light-emitting compound, a host material disclosed herein and a solvent.

The light emitting devices described herein can be configured to emit various colors of light. For example, blue emitting compounds disclosed herein and orange emitting compound(s) can be placed in the light-emitting layer to produce white light.

EXAMPLES

Example 1

General Synthetic Methods

While there are many ways readily apparent to those skilled in the art to prepare the compounds disclosed herein, general Scheme 1 illustrates a method that can be used to prepare a variety of compounds.

Scheme 1

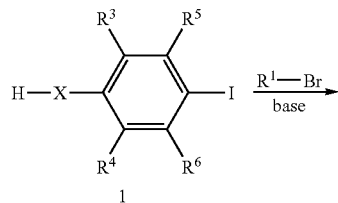

-continued

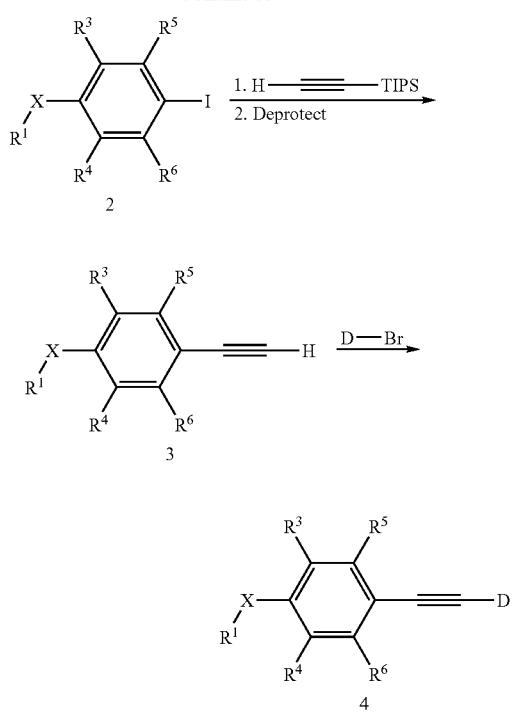

In this method, a phenyl substituted phenyl ring (compound 1) having a hydroxyl moiety (—X—H) para to a halogen such as —I, is coupled to $R^1$ using a catalyst such as a base (e.g. $K_2CO_3$) to form compound 2. Compound 2 is then coupled to a protected acetylene, via a halogen-metal coupling reaction. The acetylene is then deprotected to yield compound 3. The deprotected acetylene is then coupled to the heteroaryl ring system (represented by D above) via a second halogen-metal coupling to form compound 4. A variety of substitution is available on the aryl rings via precursor compounds which are readily purchased or prepared using standard reactions. Finally, a variety of compounds of the formula D-Br are available via commercially available compounds and standard chemistry.

Scheme 2

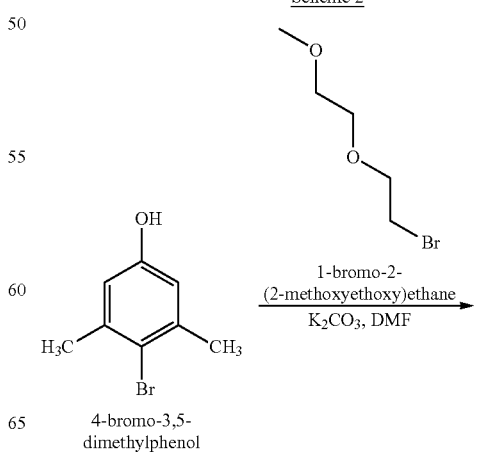

4-bromo-3,5-dimethylphenol

Example 1.2.1

4-Bromo-3,5-dimethylphenol (10.05 g, 50.0 mmol) and K₂CO₃ (9.0 g, 65.2 mmol) were stirred for 10 minutes in DMF (25 mL). 1-Bromo-2-(2-methoxyethoxy)ethane was added, and the reaction mixture was heated at 45° C. overnight under argon. After cooling to room temperature, the reaction mixture was poured into ~300 mL DCM; filtered off white solids. Flash column (silica; 100% hexane) gave 12.95 g (85% yield) of product 5.

Example 1.2.2

Pd₂(dba)₃ (600 mg) and CuI (600 mg) were added to 1,4-dioxane (75 mL). The mixture was degassed for 20 minutes, P(t-Bu)₃ (24 mL; solution as 10% in hexanes) was added, and degassing then continued for 10 minutes. Next, 4-Bromo-3,5-dimethyl-1-(2-(2-methoxyethoxy)ethoxy)benzene (5) (12.95 g, 42.7 mmol) and triisopropylsilylacetylene (31.09 g, 171 mmol) were added; and degassing continued for 15 minutes. Diisopropylamine (18 mL) was then added, and the reaction mixture was further degassed for 20 minutes. The mixture was then heated at 90° C. for 36 hours under argon.

The mixture was then removed from heat and cooled; poured mixture into ~200 mL of diethyl ether, and grey solids were filtered off. The filtrate was purified by flash column (silica; 100% hexane to 10% ethyl acetate in hexane gradient) to give 13.20 g of product 6 (76% yield).

Example 1.2.3

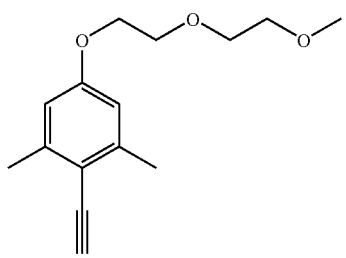

3,5-dimethyl-1-(2-(2-methoxyethoxy)ethoxy)-phenyltriisopropylsilylacetylene (6) (13.20 g, 32.7 mmol) was added to THF (50 mL) and the solution was cooled to 0° C. Tetrabutylammonium fluoride (38 mL of 1M solution, 38 mmol) was then added slowly to the solution. Next, the solution was removed from ice bath and stirred at room temperature for 70 minutes. After stirring, the solution was poured into 300 mL of saturated ammonium chloride solution and extracted twice with diethyl ether (150 mL). The organic layer was dried with sodium sulfate, and purification by flash column (silica; 100% hexane to 12% ethyl acetate in hexane gradient) gave 7.45 g of product 7 (~92%).

Example 1.2.4

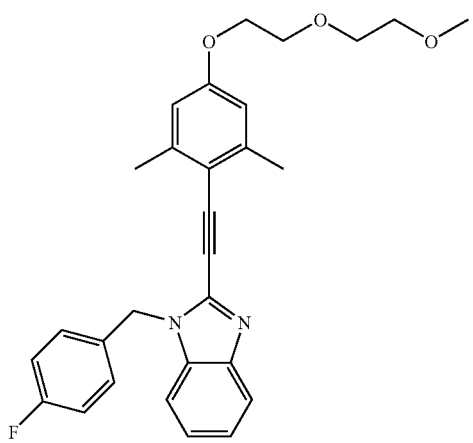

Pd$_2$(dba)$_3$ (100 mg) and CuI (100 mg) were added to 1,4-dioxane (20 mL), and the mixture was degassed for 20 minutes. P(t-Bu)$_3$ (4 mL; solution as 10% in hexanes) was added, and degassing continued 10 minutes. 3,5-dimethyl-1-(2-(2-methoxyethoxy)ethoxy)-phenylacetylene (Compound 8) (1.49 g, 6.0 mmol) and 1-(4-fluorobenzyl)-2-chlorobenzimidazole (1.4 g, 5.4 mmol) were added and degassing was continued for 10 minutes. Diisopropylamine (2.5 mL) was added and reaction mixture was degassed for 20 minutes. The reaction mixture was then heated to 68° C. overnight under argon. After cooling, the reaction mixture was poured into THF (250 mL) and filtered. The filtrate was then purified by flash column (silica; 5% to 15% ethyl acetate in DCM gradient). Recrystallization in DCM/hexane gave 72 mg of product 8 (3% yield).

Scheme 3

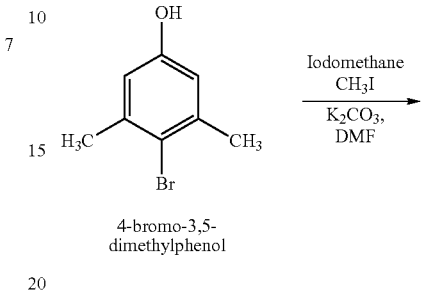

4-bromo-3,5-dimethylphenol

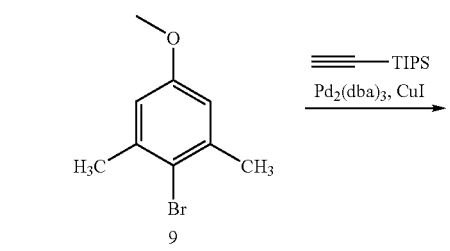

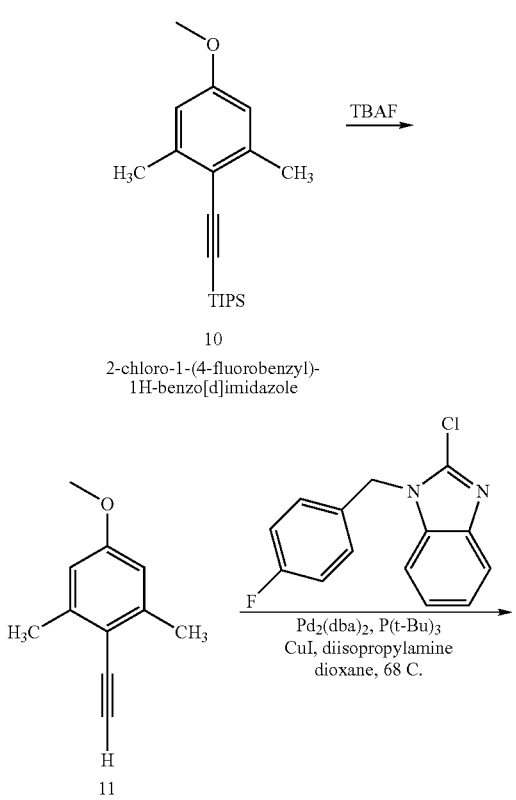

2-chloro-1-(4-fluorobenzyl)-1H-benzo[d]imidazole

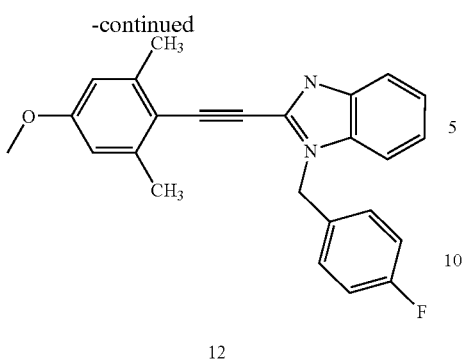

12

Example 1.3.1

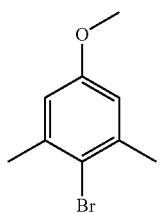

A mixture of 4-bromo-3,5-dimethylphenol (4.0 g, 19.9 mmol) and $K_2CO_3$ (4.14 g, 30.0 mmol) was stirred in DMF (15 mL) for 10 minutes. Iodomethane (5.76 g, 40.0 mmol) was added and the reaction mixture was heated at 35° C. for 23 hours under argon. After cooling, mixture was poured into DCM (150 mL); white solids were filtered off. The filtrate was purified by flash column (silica; 100% hexane) to give 2.79 g of product 9 (65% yield).

Example 1.3.2

10

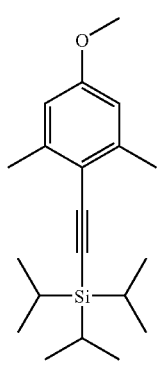

$Pd_2(dba)_3$ (150 mg) and CuI (150 mg) were added to 1,4-dioxane (15 mL) and the mixture was degassed for 20 minutes. Next, 2,6-dimethyl-4-methoxybromobenzene (9) (2.60 g, 12.1 mmol) and triisopropylsilylacetylene (9.43 g, 51.7 mmol) were added and degassing continued for 10 minutes. Finally, diisopropylamine (4.5 mL) was added and reaction mixture was degassed for 20 minutes. The mixture was then heated at 90° C. overnight under argon. The mixture was then cooled, poured into diethyl ether (100 mL), and filtered. Flash column (silica; 100% hexane) gave 3.59 g of product 10 (94% yield).

Example 1.3.3

11

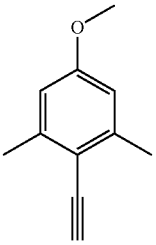

3,5-dimethyl-1-methoxyphenyltriisopropylacetylene (10) (3.50 g, 11.1 mmol) in THF (20 mL) was cooled to 0° C. and tetrabutylammonium fluoride (15 mL of 1M solution, 15 mmol) was slowly added. The solution was then removed from the ice bath and stirred at room temperature for 60 minutes under argon. Next, the solution was poured into 300 mL of saturated ammonium chloride solution, and extracted twice with diethyl ether (100 mL). Flash column purification (silica; 100% hexane) gave 1.47 g of product 11 (83% yield).

Example 1.3.4

12

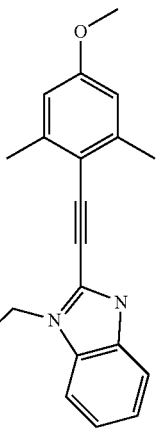

$Pd_2(dba)_3$ (100 mg) and CuI (100 mg) were added to 1,4-dioxane (15 mL) and the mixture was degassed for 20 minutes. Next, $P(t-Bu)_3$ (4 mL; solution as 10% in hexanes) was added, and degassing continued 10 minutes. 3,5-dimethyl-1-methoxyphenylacetylene (11) (1.4 g, 8.8 mmol) and 4-bromo-2,6-difluorobenzenonitrile (1.74 g, 8.0 mmol) were then added and degassing was continued for another 10 min. Finally, diisopropylamine (2.5 mL) was added and reaction mixture was degassed an additional 20 minutes. The mixture was then heated at 68° C. overnight under argon. After heating, the mixture was cooled, poured it into THF (150 mL), and filtered. Filtrate was purified by flash column (silica; 100% hexane to 4% ethyl acetate in hexane gradient) to give 1.96 g of crude material. After vacuum sublimation, 1.65 g of product 12 was isolated (69% yield).

Scheme 4

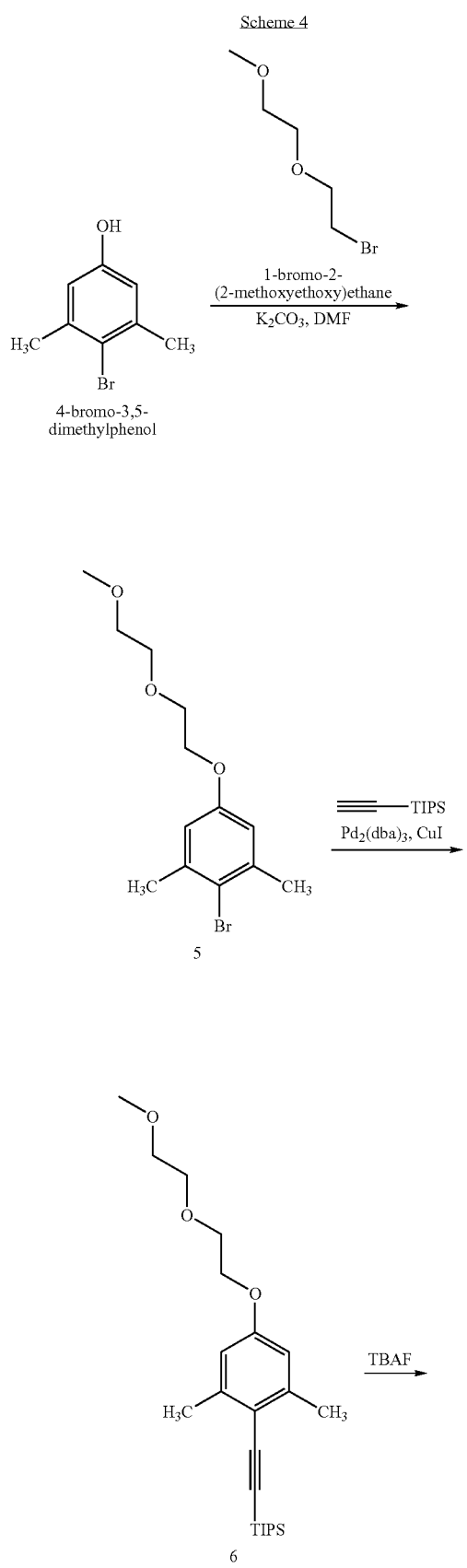

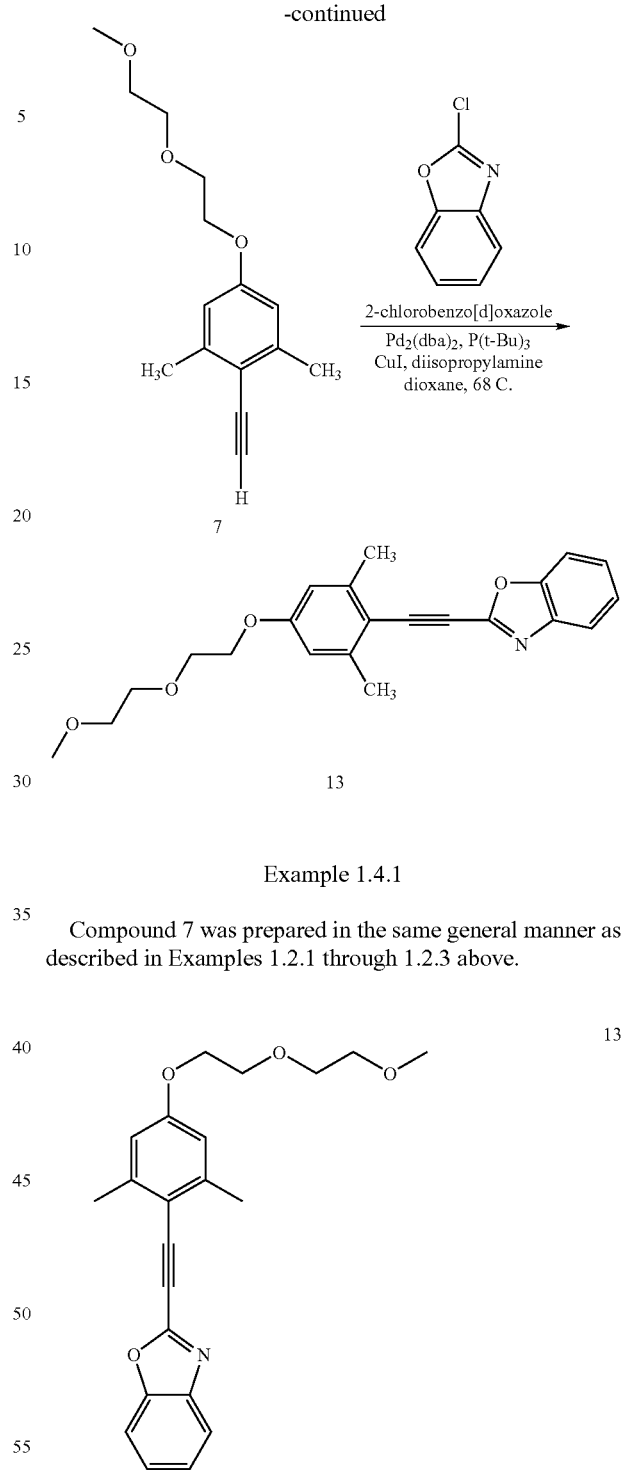

Example 1.4.1

Compound 7 was prepared in the same general manner as described in Examples 1.2.1 through 1.2.3 above.

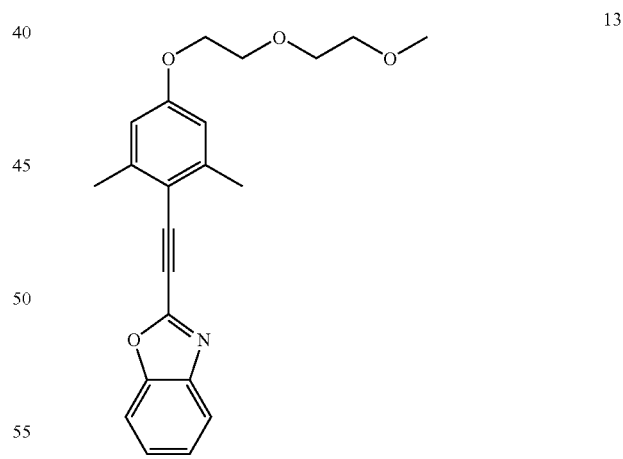

Pd$_2$(dba)$_3$ (150 mg) and CuI (150 mg) were added to 1,4-dioxane (20 mL), and the mixture was degassed for 20 minutes. P(t-Bu)$_3$ (6 mL; solution as 10% in hexanes) was then added, and degassing continued 10 minutes. Next, 3,5-dimethyl-1-(2-(2-methoxyethoxy)ethoxy)-phenylacetylene (Compound 7) (2.5 g, 10.1 mmol) and 2-chlorobenzo[d]oxazole (1.46 g, 9.5 mmol) were added and degassing continued for 10 another minutes. Diisopropylamine (4.5 mL) was then added, and reaction mixture was further degassed for 20 minutes. The reaction mixture was then heated at 68° C.

overnight under argon. After heating, the mixture was cooled, and was then poured into THF (250 mL) and filtered. A flash column done with the filtrate (silica; 10% to 50% DCM in hexane gradient) and two recrystallizations in DCM/hexane and DCM/MeOH gave 1.2 g of product 13 (34% yield).

Scheme 5

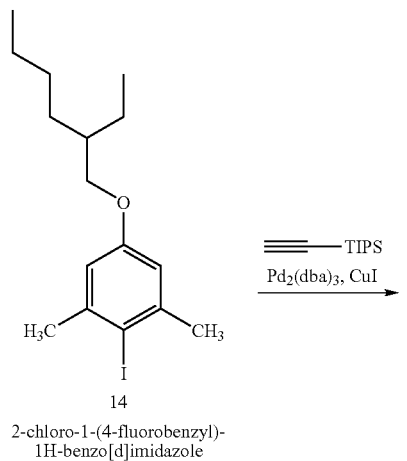

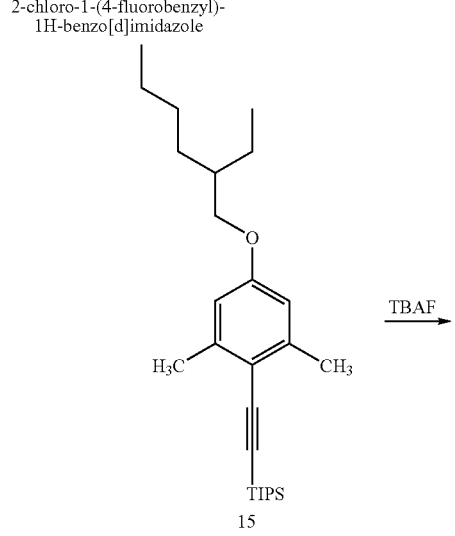

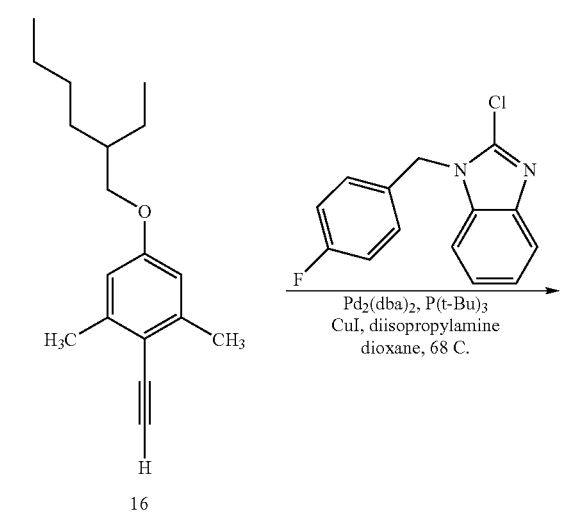

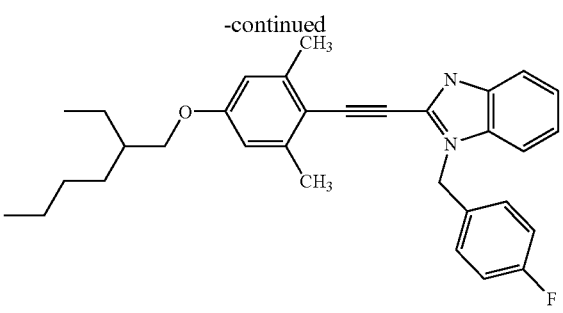

17

Example 1.5.1

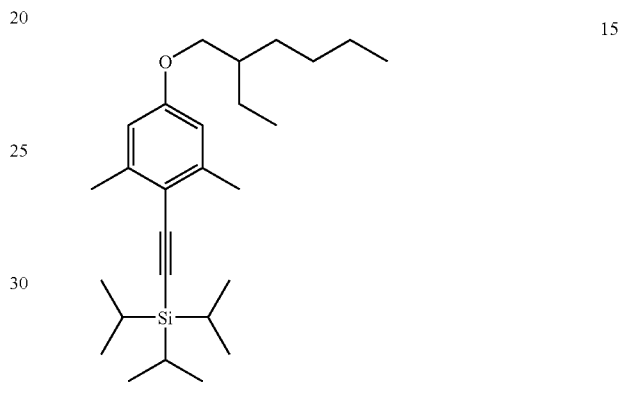

Pd$_2$(dba)$_3$ (100 mg) and CuI (100 mg) were added to 1,4-dioxane (15 mL) and the mixture was degassed for 20 minutes. P(t-Bu)$_3$ (4 mL; solution as 10% in hexanes) was then added, and degassing continued 10 minutes. Next, 2,6-dimethyl-4-(2-ethylhexoxy)iodobenzene (14) (1.5 g, 4.2 mmol) and triisopropylsilylacetylene (3.04 g, 16.7 mmol) were added and degassing continued another 10 minutes. Finally, diisopropylamine (2.5 mL) was added and reaction mixture was degassed for another 20 minutes. The mixture was then heated at 90° C. overnight under argon. After cooling, the reaction mixture was poured into diethyl ether (100 mL) and filtered. The filtrate was purified by flash column (silica; 100% hexane) to give 1.52 g of product 15 (88% yield).

Example 1.5.2

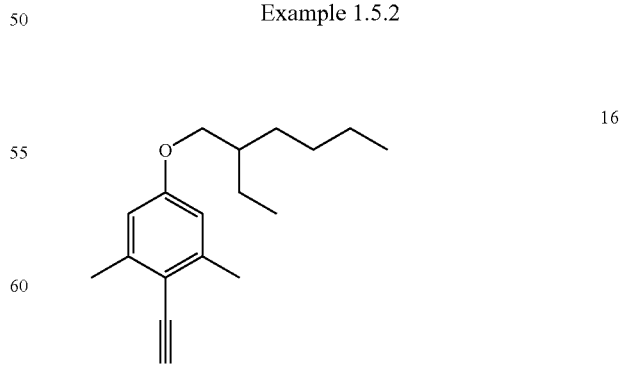

3,5-dimethyl-1-(2-ethylhexoxy)phenyltriisopropylsilylacetylene (15) (1.45 g, 3.50 mmol) in THF (10 mL) was cooled to 0° C., and tetrabutylammonium fluoride (4 ml of 1M solution, 4 mmol) was slowly added. The solution removed from the ice bath and stirred at room temperature for 60 minutes under argon. The solution was then poured into 150 mL of saturated ammonium chloride solution and extracted with diethyl ether (3×100 mL). A flash column (silica; 100% hexane) gave 800 mg of product 16 (84% yield).

Example 1.5.3

Pd₂(dba)₃ (70 mg) and CuI (70 mg) were added to 1,4-dioxane (15 mL) and the mixture was degassed for 20 minutes. Next, P(t-Bu)₃ (3 mL; solution as 10% in hexanes) was added, and degassing continued 10 minutes. Then, 3,5-dimethyl-1-(2-ethylhexoxy)phenylacetylene (16) (790 mg, 2.7 mmol) and 2-chloro-1-(4-fluorobenzyl)-1H-benzol[d]imidazole (525 mg, 2.4 mmol) were added and degassing continued for 10 minutes. Finally, diisopropylamine (2 mL) was added and reaction mixture was degassed for 20 minutes. The reaction mixture was then heated at 68° C. overnight under argon. After cooling, the reaction mixture was poured into THF (100 mL) and filtered. The filtrate was purified by flash column (silica; 2% to 25% DCM in hexane gradient), and recrystallization in DCM/MeOH gave 730 mg of product 17 (74% yield).

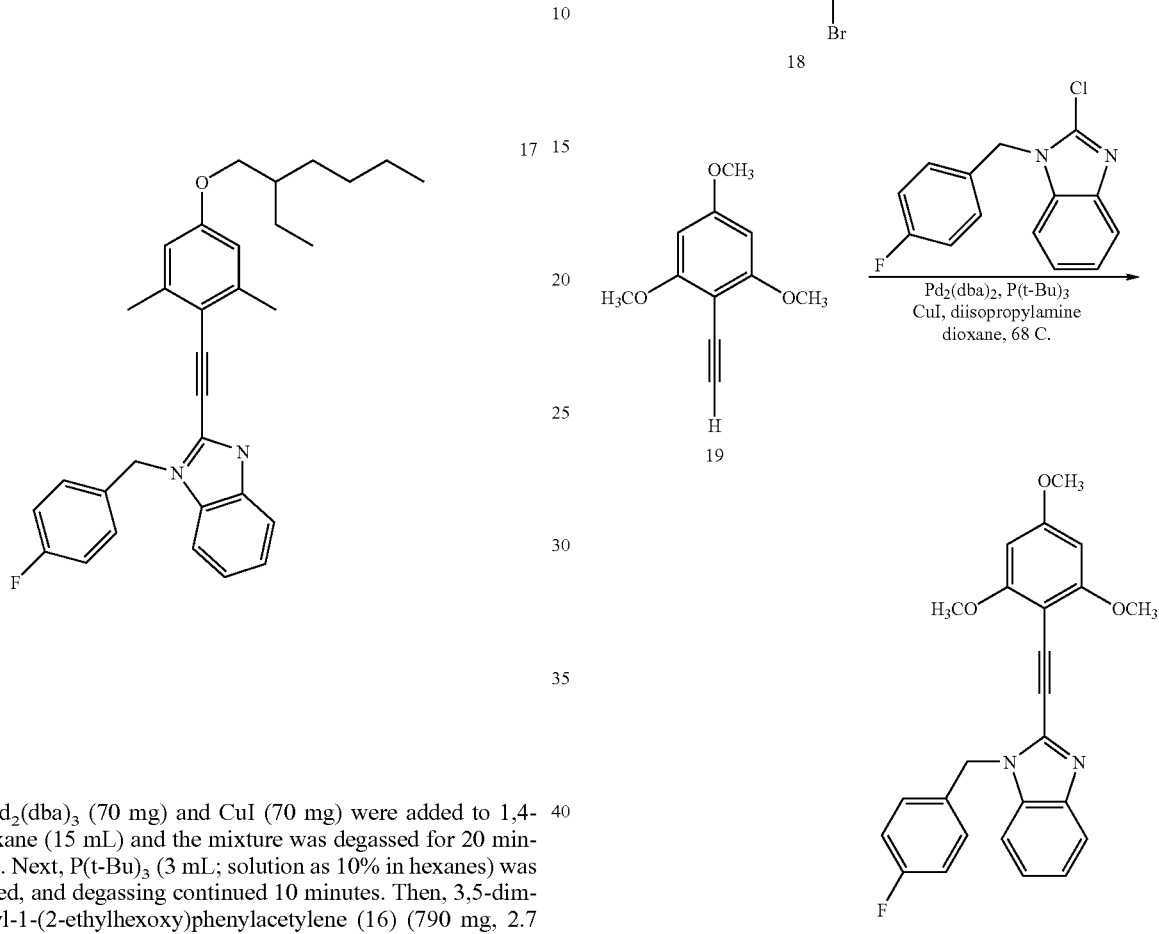

Example 1.6.1

2,4,6-trimethoxybenzaldehyde (10.0 g, 51 mmol) and bromomethyl-triphenylphosphonium bromide (24.45 g, 56 mmol) in THF (200 mL) were cooled to 0° C., and potassium tert-butoxide (66 mL of 1M solution, 66 mmol) was slowly added. The reaction mixture was stirred overnight while slowly warming to room temperature. Flash column purification (silica; 10% to 20% ethyl acetate in hexane gradient) gave 9.3 g of product 18 (67% yield).

Example 1.6.2

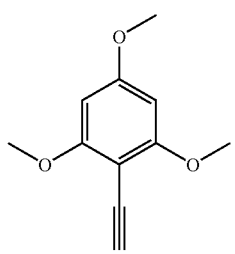

2-(2-bromoethenyl)-1,3,5-trimethoxybenzene (18) (9.27 g, 33.9 mmol) was dissolved in THF (200 mL), and potassium tert-butoxide (70 mL of 1M solution, 70 mmol) was slowly added. The reaction mixture was heated at reflux (90° C.) for two hours. After cooling, KBr salts were filtered from the reaction mixture. The salts were washed with additional THF (50 mL), and all filtrates were combined. Flash column purification (silica; 20% ethyl acetate in hexane) gave 3.84 g of product 19 (59% yield).

Example 1.6.3

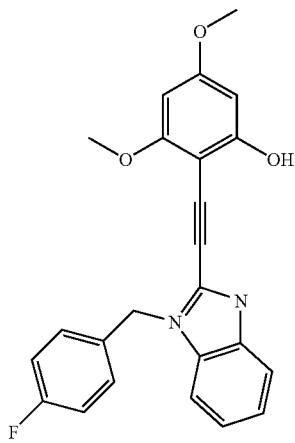

20

Pd$_2$(dba)$_3$ (150 mg) and CuI (150 mg) were added to 1,4-dioxane (30 mL) and the mixture was degassed for 20 minutes. P(t-Bu)$_3$ (6 mL; solution as 10% in hexanes) was then added, and degassing continued 10 minutes. Next, 2,4,6-trimethoxyphenylacetylene (19) (2.0 g, 10.4 mmol) and 4-bromo-2,6-difluorobenzenonitrile (2.13 g, 9.8 mmol) were added and degassing continued for 10 minutes. Finally, diisopropylamine (4.5 mL) was added, and reaction mixture was further degassed for 20 minutes. The reaction mixture was heated at 68° C. overnight under argon. The mixture was cooled, then poured into THF (250 mL) and filtered. A flash column done with the filtrate (silica; 10% to 50% ethyl acetate in hexane gradient) gave 1.45 g of product 20 (45% yield).

Scheme 7

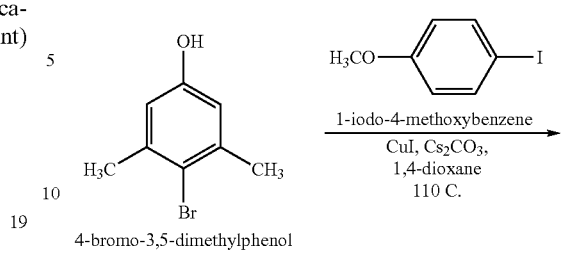

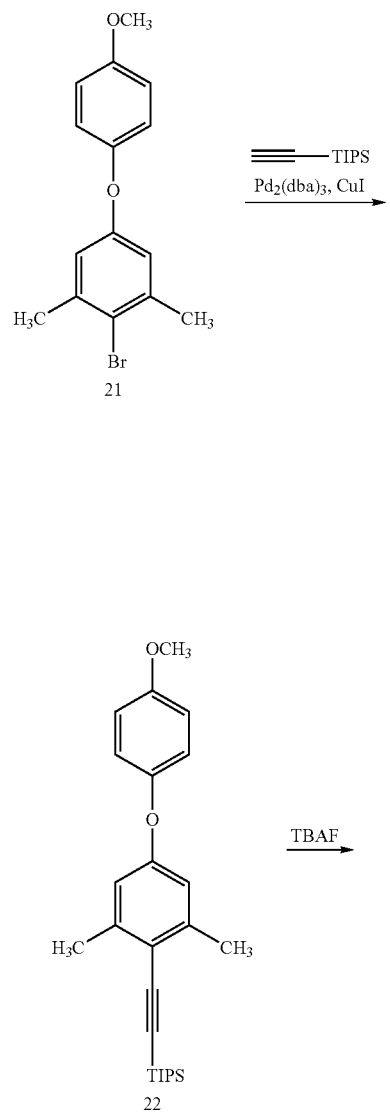

2-chloro-1-(4-fluorobenzyl)-
1H-benzo[d]imidazole

-continued

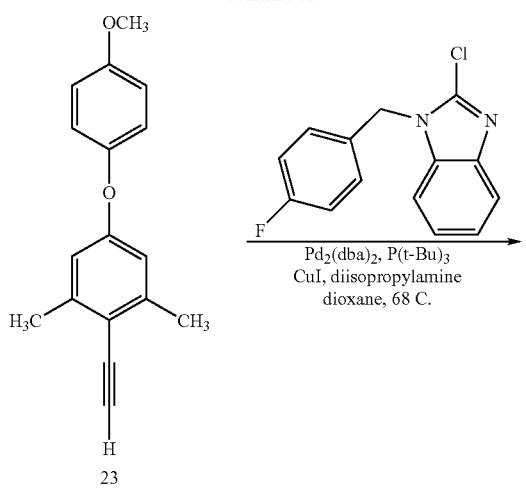

23

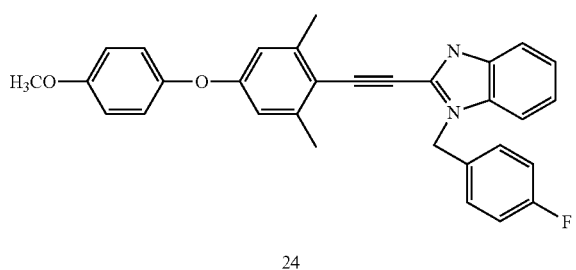

24

Example 1.7.1

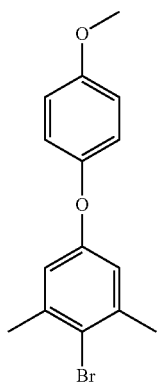

21

To a mixture of 4-iodoanisole (5.0 g, 21.4 mmol), 4-bromo-3,5-dimethylphenol (6.44 g, 32.1 mmol), cesium carbonate (13.95 g, 42.8 mmol) and dimethylglycine hydrochloride (896 mg, 6.42 mmol) was added 1,4-dioxane (25 mL). Freeze-thaw method (2 cycles) was used to purge the mixture. Copper Iodide (407 mg, 2.14 mmol) was added to the mixture, and freeze-thaw (3 cycles) was continued. The reaction mixture heated at 120° C. overnight. After cooling, the mixture was poured into ethyl acetate (200 mL) and washed with water and brine. Flash column purification (silica; 100% hexane to 1% ethyl acetate in hexane gradient) gave 3.05 g of product 21 (46% yield).

Example 1.7.2

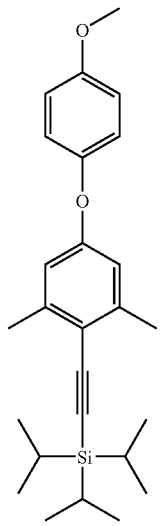

22

Pd$_2$(dba)$_3$ (250 mg) and CuI (250 mg) were added to 1,4-dioxane (35 mL) and the mixture was degassed for 20 minutes. P(t-Bu)$_3$ (12 mL; solution as 10% in hexanes) was then added, and degassing continued 10 minutes. Next, 1-bromo-2,6-dimethyl-4-(4-methoxyphenoxy)benzene (21) (3.90 g, 12.66 mmol) and triisopropylsilylacetylene (9.24 g, 50.6 mmol) were added and degassing continued for another 10 minutes. Finally, diisopropylamine (7.5 mL) was added, and the reaction mixture was further degassed for 20 minutes. The reaction mixture was heated at 90° C. overnight under argon. The mixture was cooled, then poured into diethyl ether (200 mL) and filtered. A flash column purification of the filtrate (silica; 2% to 5% ethyl acetate in hexane gradient) gave 4.97 g of product 22 (96% yield).

Example 1.7.3

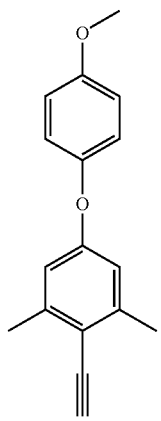

23

2,6-dimethyl-4-(4-methoxyphenoxy)phenyltriisopropylsilylacetylene (22) (4.8 g, 11.7 mmol) in THF (25 mL) was cooled to 0° C. and tetrabutylammonium fluoride (15 mL of 1M solution, 15 mmol) was slowly added. The solution was removed from the ice bath, stirred at room temperature for 1.5 hours, then poured into saturated ammonium chloride solution (250 mL), and extracted with diethyl ether (3 times 150 mL). Flash column purification (silica; 2% TO 5% ethyl acetate in hexane gradient) gave 2.22 g of product 23 (75% yield).

Example 1.7.4

24

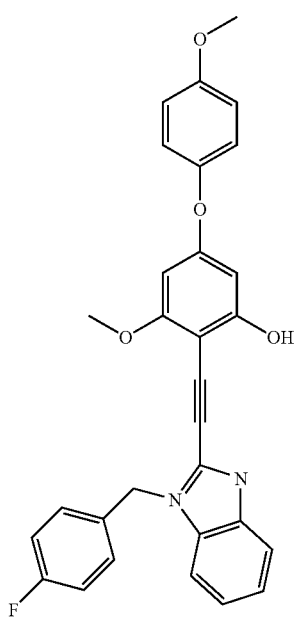

Pd$_2$(dba)$_3$ (150 mg) and CuI (150 mg) were added to 1,4-dioxane (20 mL) and the mixture was degassed for 20 minutes. P(t-Bu)$_3$ (6 mL; solution as 10% in hexanes) was then added, and degassing continued 10 minutes. 2,6-dimethyl-4-(4-methoxyphenoxy)phenylacetylene (23) (1.5 g, 5.9 mmol) and 2-chloro-1-(4-fluorobenzyl)-1H-benzol[d]imidazole (1.18 g, 5.4 mmol) were added, and degassing continued for 10 minutes. Diisopropylamine (4.5 mL) was added, and reaction mixture was further degassed for 20 minutes. The reaction mixture was then heated to 68° C. overnight under argon. After overnight heating, the mixture was cooled, then poured into THF (200 mL) and filtered. A flash column of the filtrate (silica; 2% to 10% ethyl acetate in hexane gradient) and two recrystallizations in DCM/hexane and DCM/MeOH gave 1.58 g of product 24 (75% yield).

Example 2

Device Fabrication

Fabrication of light-emitting device: the ITO coated glass substrates were cleaned by ultrasound in acetone, and consecutively in 2-propanol, baked at 110° C. for 3 hours, followed by treatment with oxygen plasma for 5 min. A layer of PEDOT: PSS (Baytron P purchased from H.C. Starck) was spin-coated at 3000 rpm onto the pre-cleaned and O$_2$-plasma treated (ITO)-substrate and annealed at 180° C. for 10 min, yielding a thickness of around 40 nm. In a glove-box hosted vacuum deposition system at a pressure of 10$^{-7}$ torr (1 torr=133.322 Pa), 4,4'4''-tri(N-carbazolyl)triphenylamine (TCTA) was first deposited on top of PEDOT/PSS layer at deposition rate of 0.06 nm/s, yielding a 30 nm thick film. Then 4,4'-bis(carbazol-9-yl)biphenyl (CBP) and deep blue emitter compound 13 were concurrently heated and deposited on top of TCTA under different deposition speed (about 0.0018 nm/s) to make 13 at 3 wt %, followed by deposition of 1,3,5-tris(N-phenylbenzimidizol-2-yl)benzene (TPBI) at a deposition rate of about 0.06 nm/s. CsF and Al were then deposited successively at deposition rates of 0.005 and 0.2 nm/s, respectively. Each individual device has an area of 0.14 cm$^2$.

Example 3

Device Performance

Figure 2:
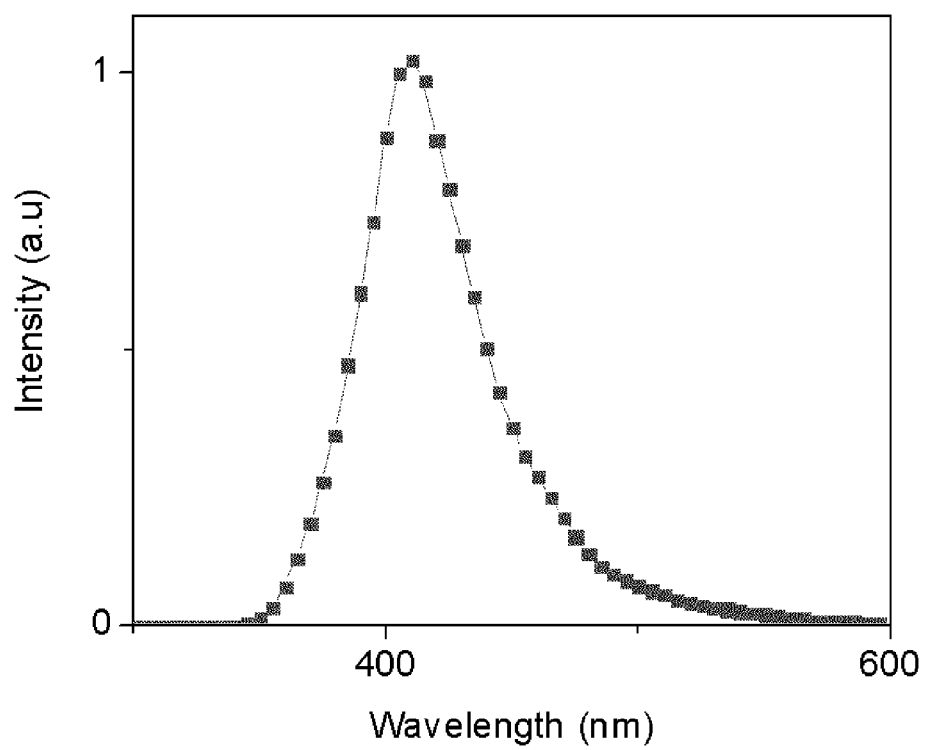
FIG. 2 is graph depicting the electroluminescent spectrum (intensity [a.u.] as a function of wavelength) of the device of FIG. 1.
Figure 3:
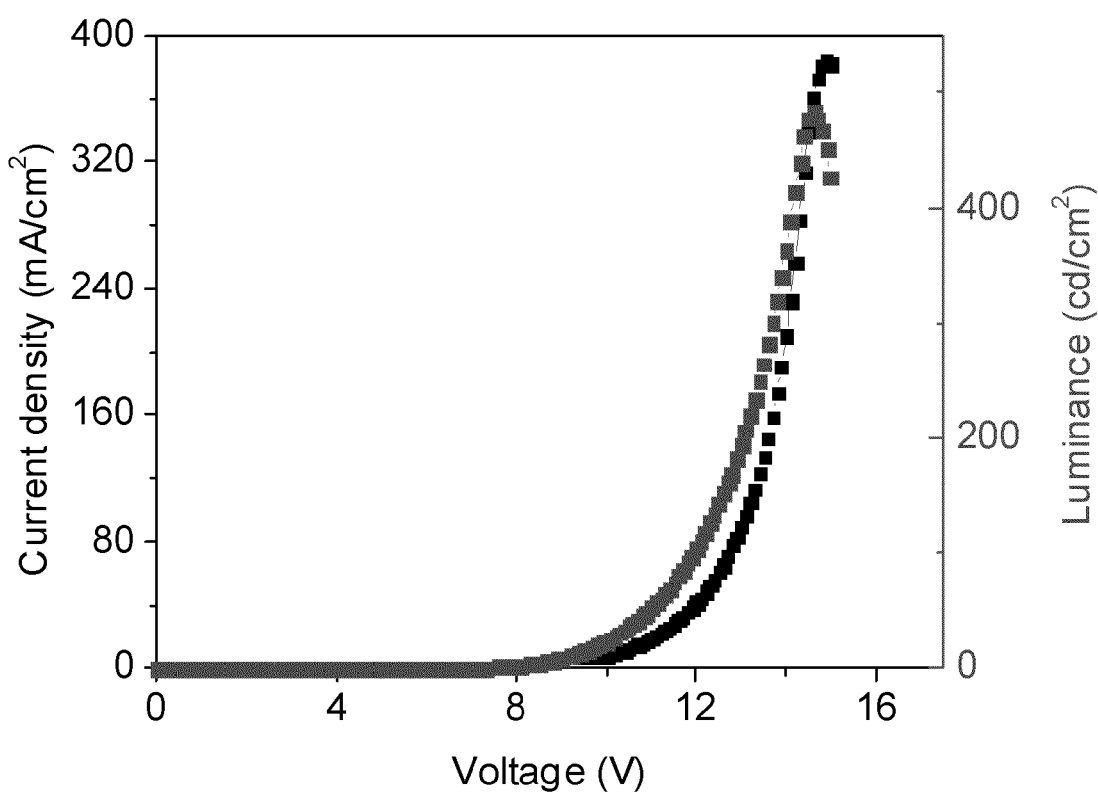
FIG. 3 is a graph depicting the Current density ($mA/cm^2$) and luminance (cd/m) as a function of the driving voltage (volts) of the device of FIG. 1.
Figure 4:
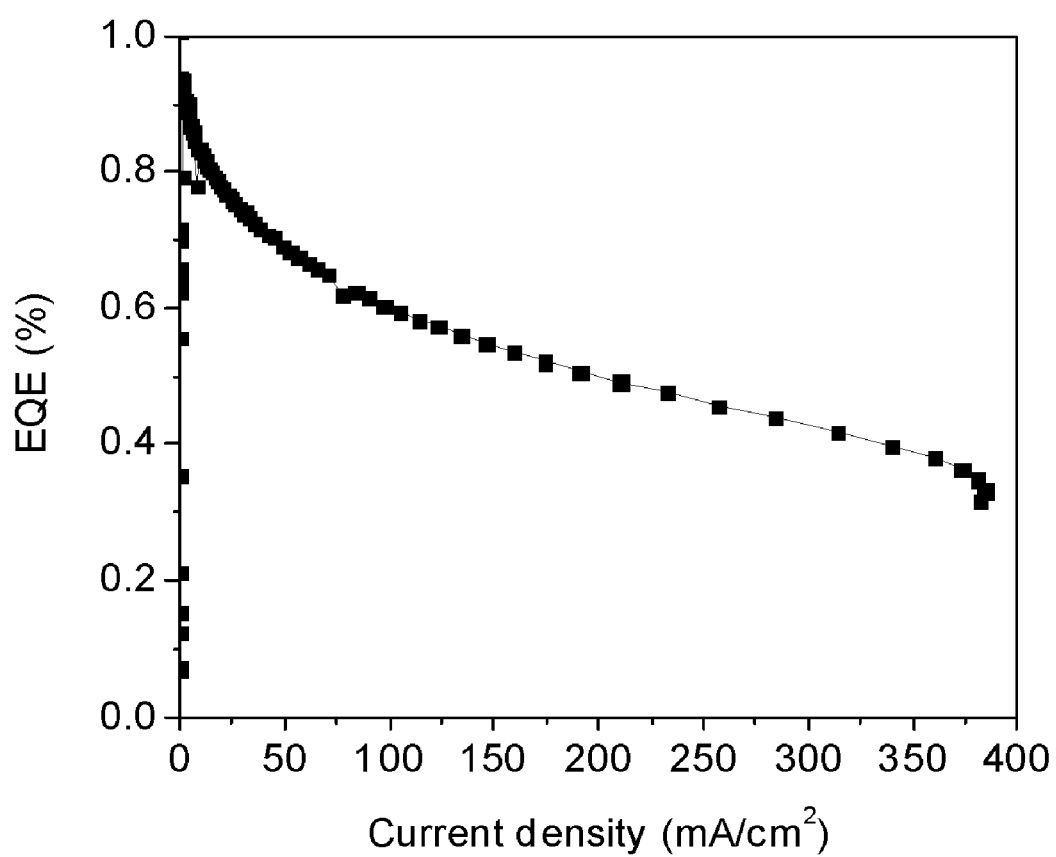
FIG. 4 is a graph depicting the External Quantum Efficiency (EQE (%)) and luminous efficiency as a function of current density of Device A of the device of FIG. 1.

Device A, comprising Compound 13 and fabricated in accordance with Examples 1 and 2, was tested to determine the emissive qualities of the device by examining the (1) emissive intensity of Device A (intensity of the device [a.u.] as a function of wavelength; (2) determining the CIE coordinates of Device A; and (3) determining the efficiency of Device A (current density and luminescence as a function of the voltage applied to the device; and external quantum efficiency and luminescence as a function of current density). All spectra were measured with an Ocean Optics HR 4000 spectrometer (Ocean Optics, Dunedin, Fla., USA) and I-V-L characteristics were taken with a Keithley 2400 SourceMeter (Keithley Instruments, Inc., Cleveland, Ohio, USA) and Newport 2832-C power meter and 818 UV detector (Newport, Corp., Irvine, Calif., USA). All device operation was performed inside a nitrogen-filled glove-box. An exemplary configuration of the device (Device A) is shown in FIG. 1. FIG. 2 shows electroluminescence spectrum of Device A. The spectrum shows significant emission between 400 and 500 nm. The purity of the deep blue emitted radiation is demonstrated by the CIE coordinates (X=0.16; Y=0.10). In addition, as shown in FIGS. 3 and 4, Device A demonstrates efficacy in conventional LED operating parameters. Thus Compound 13 has demonstrated its effectiveness as a blue emitting compound in light emitting devices.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:
1. An emissive compound represented by a formula:

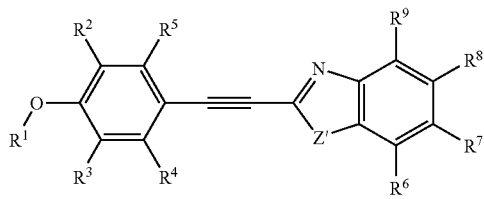

wherein R$^1$ is C$_{1-30}$ alkyl, optionally substituted C$_{6-10}$ aryl, or C$_{1-30}$O$_{1-15}$ ether;

R$^2$, R$^3$, R$^4$ and R$^5$ are independently H, C$_{1-10}$ alkyl, or C$_{1-10}$ alkoxyl;

$R^6$, $R^7$, $R^8$, and $R^9$ are independently H, optionally substituted $C_{6-30}$ aryl, $C_{1-10}$ alkyl, or $C_{1-10}$ alkoxyl; and $Z'$ is independently $NR^{10}$ or O, wherein $R^{10}$ is phenyl, phenylmethyl, or (4-halophenyl)methyl.

2. The compound of claim 1, wherein $R^1$ is

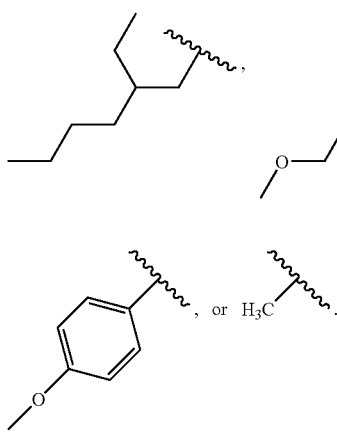

3. The compound of claim 1, wherein $R^2$, $R^3$, $R^4$, and $R^5$ are independently selected from: H, $C_{1-4}$ alkyl, and $C_{1-4}$ alkoxyl.

4. The compound of claim 1, wherein $R^4$ and $R^5$ are independently $CH_3$ or $OCH_3$.

5. The compound of claim 1, wherein $R^6$, $R^7$, $R^8$, and $R^9$ are H.

6. The compound of claim 1, further represented by a formula:

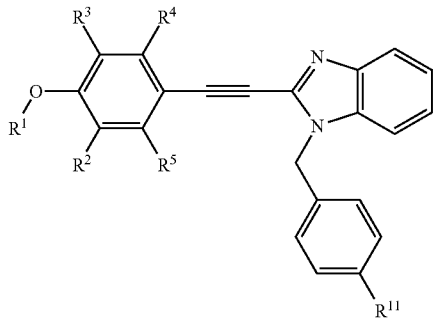

wherein $R^{11}$ is H, F, Cl, or Br.

7. The compound of claim 1, further represented by a formula:

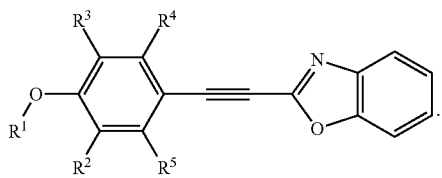

8. The compound of claim 1, selected from:

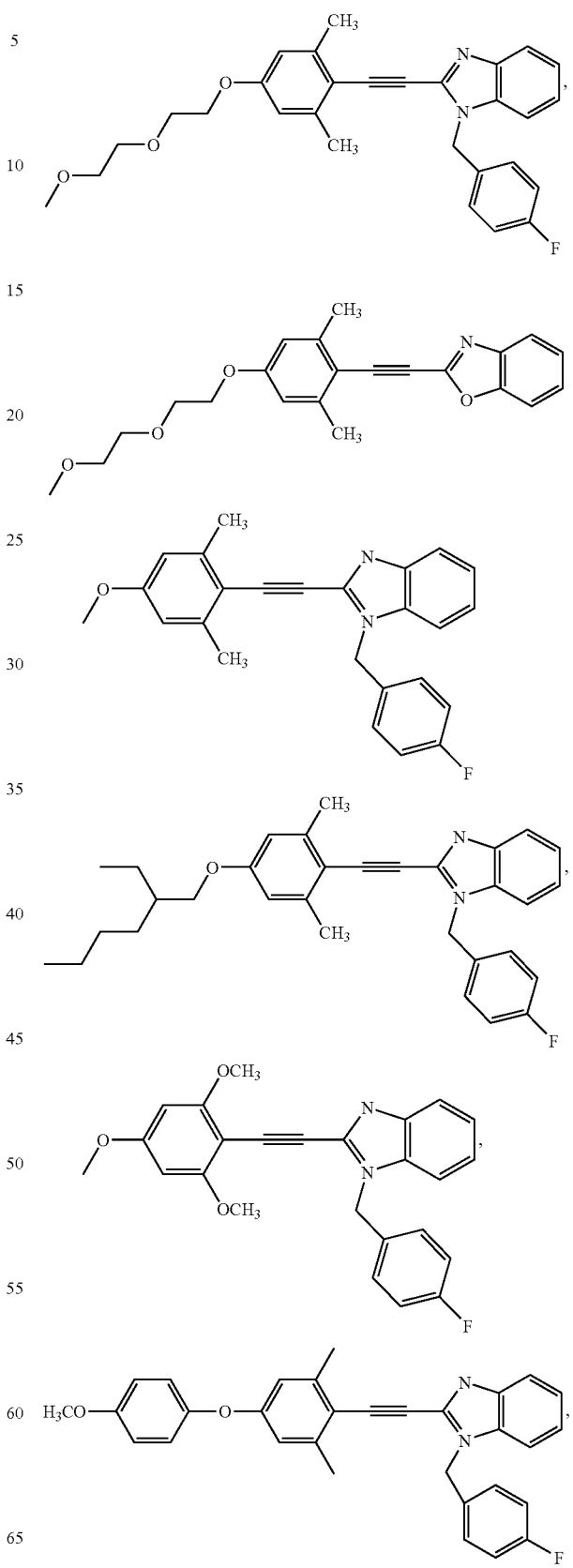

-continued

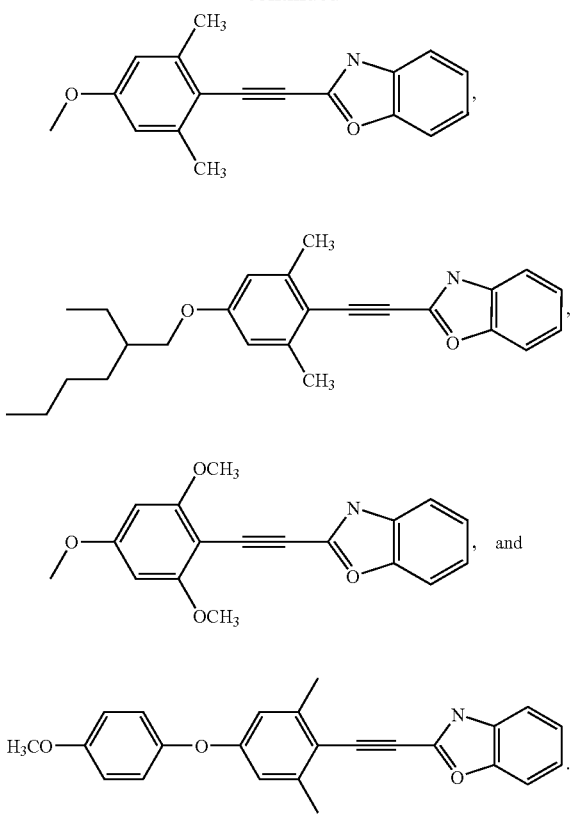

9. A light-emitting device, comprising:
an anode layer;
a cathode layer; and
a light-emitting layer positioned between, and electrically connected to, the anode layer and the cathode layer, the light-emitting layer comprising a compound of claim 1.

10. The device of claim 9, wherein $R^1$ is

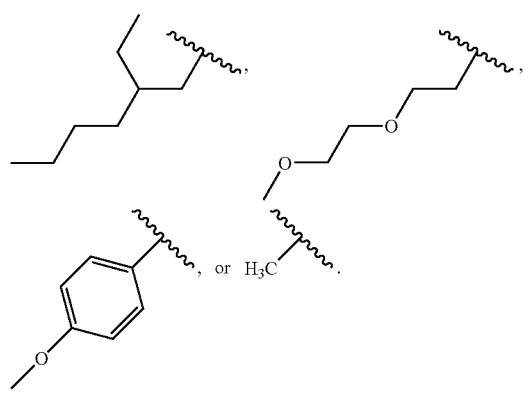

11. The device of claim 9, wherein $R^2$, $R^3$, $R^4$, and $R^5$ are independently selected from: H, $C_{1-4}$ alkyl, and $C_{1-4}$ alkoxyl.

12. The device of claim 9, wherein $R^4$ and $R^5$ are independently $CH_3$ or $OCH_3$.

13. The device of claim 9, wherein the compound is represented by a formula:

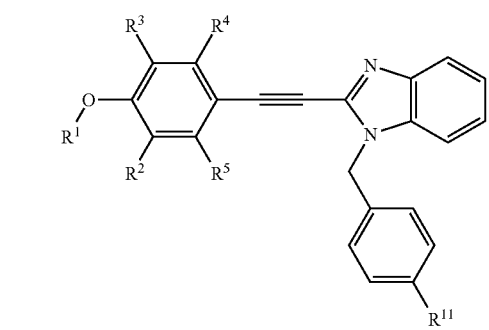

wherein $R^{11}$ is H, F, Cl, or Br.

14. The device of claim 9, wherein the compound is represented by a formula:

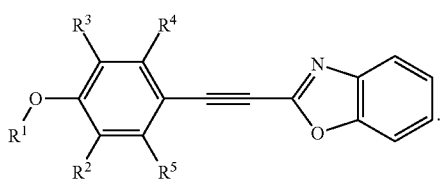

15. The device of claim 9, wherein the compound is selected from:

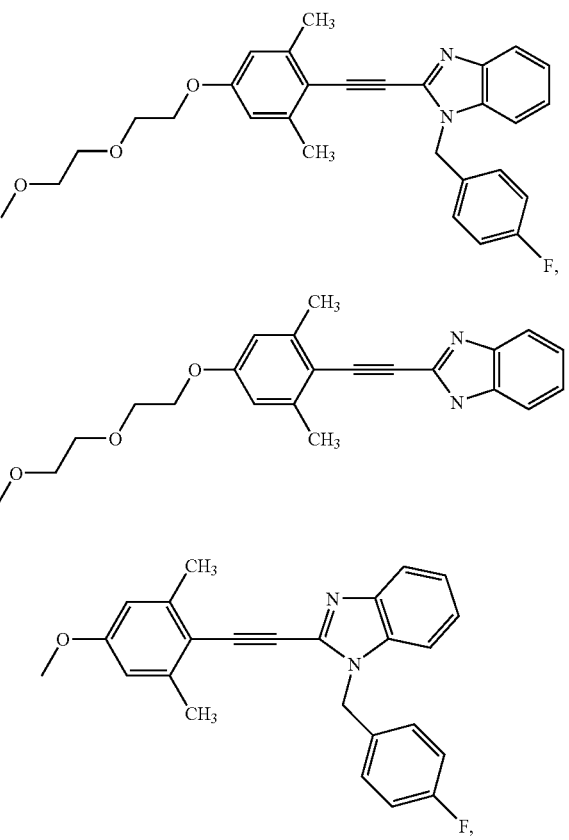

37
-continued
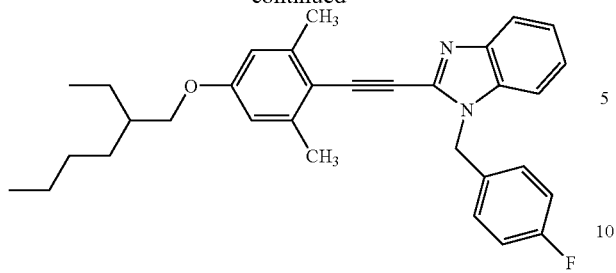
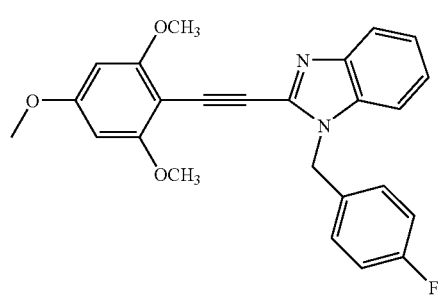
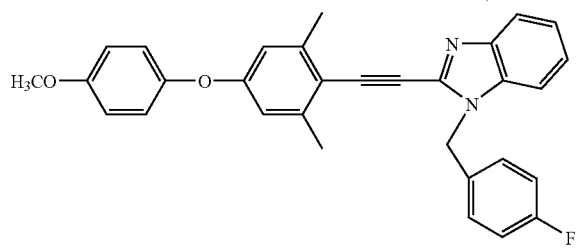
38
-continued
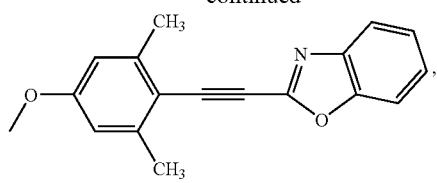
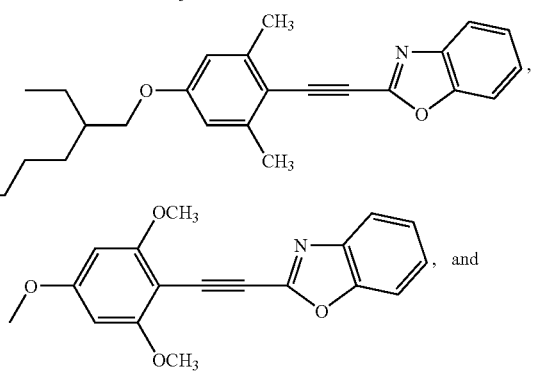
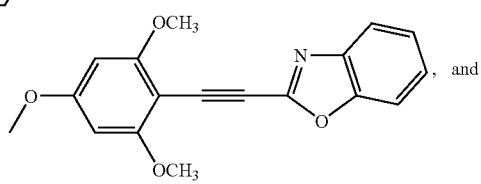
* * * * *